(12) United States Patent
Dane et al.

(10) Patent No.: US 9,083,948 B2
(45) Date of Patent: Jul. 14, 2015

(54) CROSSTALK REDUCTION IN MULTIVIEW VIDEO PROCESSING

(75) Inventors: Gokce Dane, San Diego, CA (US); Vasudev Bhaskaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 425 days.

(21) Appl. No.: 13/552,340

(22) Filed: Jul. 18, 2012

(65) Prior Publication Data

US 2014/0022339 A1    Jan. 23, 2014

(51) Int. Cl.
*H04N 13/00* (2006.01)
(52) U.S. Cl.
CPC .................. *H04N 13/0033* (2013.01)
(58) Field of Classification Search
CPC .......... H04N 13/0055; H04N 13/0422; H04N 2013/0077; H04N 5/211; H04N 5/21; G06T 7/0075; G06T 5/001; G06T 17/20; G06T 19/00; G09G 5/02; G09G 2320/0666
USPC .............. 348/43, 51, 614, 624; 382/154, 167; 345/589, 600, 690
See application file for complete search history.

(56) References Cited

U.S. PATENT DOCUMENTS

| 6,002,518 A * | 12/1999 | Faris .............................. 359/465 |
| 2003/0026474 A1 | 2/2003 | Yano |
| 2006/0268104 A1 | 11/2006 | Cowan et al. |
| 2008/0036696 A1 | 2/2008 | Slavenburg et al. |
| 2009/0051759 A1 | 2/2009 | Adkins et al. |
| 2010/0040280 A1 | 2/2010 | McKnight |
| 2010/0134493 A1* | 6/2010 | Kwak et al. .................... 345/426 |
| 2011/0025832 A1* | 2/2011 | Cowan et al. .................... 348/51 |
| 2011/0038042 A1 | 2/2011 | Redmann et al. |
| 2011/0080401 A1 | 4/2011 | Tan et al. |
| 2011/0090243 A1 | 4/2011 | Park et al. |
| 2011/0134229 A1* | 6/2011 | Matsumoto et al. ............ 348/56 |
| 2011/0141130 A1 | 6/2011 | Yagiura |
| 2011/0175904 A1 | 7/2011 | Van Baar et al. |
| 2011/0188106 A1 | 8/2011 | Bae et al. |
| 2011/0199458 A1* | 8/2011 | Hayasaka et al. ............... 348/43 |

(Continued)

FOREIGN PATENT DOCUMENTS

| GB | 2453751 A | 4/2009 |
| JP | H08331600 A | 12/1996 |

(Continued)

OTHER PUBLICATIONS

International Search Report and Written Opinion—PCT/US2013/046404—ISA/EPO—Sep. 6, 2013, 9 pp.

(Continued)

*Primary Examiner* — Victor Kostak
(74) *Attorney, Agent, or Firm* — Shumaker & Sieffert, P.A.

(57) ABSTRACT

In one example, a method includes identifying a first set of pixels in co-located pairs in a corresponding pair of multiview image frames for which the co-located pairs have a disparity between the pixels that is greater than a selected disparity threshold. The method further includes identifying a second set of pixels in at least one of the image frames that are within a selected distance of an intensity transition greater than a selected intensity transition threshold. The method further includes applying crosstalk correction to pixels that are identified as being in at least one of the first set and the second set.

57 Claims, 11 Drawing Sheets

(56) References Cited

U.S. PATENT DOCUMENTS

| | | | |
|---|---|---|---|
| 2012/0044330 A1 | 2/2012 | Watanabe | |
| 2012/0050263 A1* | 3/2012 | Kang | 345/419 |
| 2012/0057780 A1* | 3/2012 | Matsumoto | 382/154 |
| 2012/0062709 A1 | 3/2012 | Kerofsky et al. | |
| 2012/0086713 A1 | 4/2012 | Cho et al. | |
| 2012/0147162 A1 | 6/2012 | Park et al. | |
| 2012/0287250 A1* | 11/2012 | Doutre et al. | 348/51 |
| 2012/0320056 A1 | 12/2012 | Ahn et al. | |
| 2013/0063575 A1* | 3/2013 | Jia et al. | 348/51 |
| 2013/0113887 A1* | 5/2013 | Jeon et al. | 348/46 |
| 2013/0207955 A1 | 8/2013 | Kim et al. | |
| 2013/0229498 A1 | 9/2013 | Yano et al. | |

FOREIGN PATENT DOCUMENTS

| | | |
|---|---|---|
| WO | 2009150529 A1 | 12/2009 |
| WO | WO2012033224 A1 | 3/2012 |
| WO | 2012046687 A1 | 4/2012 |

OTHER PUBLICATIONS

Konrad et al., "Cancellation of image crosstalk in time-sequential displays of stereoscopic video," IEEE Trans. Image Process., vol. 9, No. 5, pp. 897-908, May 2000.

Sullivan et al., "Editors' draft revision to ITU-T Rec. H.264 ISO/IEC 14496-10 Advanced Video Coding—in preparation for ITU-T SG 16 AAP Consent (in integrated form)," Document: JVT-AA007, 30th Meeting: Geneva, CH, Jan. 29-Feb. 3, 2009, 684 pp.

U.S. Appl. No. 13/552,370, by Gokce Dane, filed Jul. 18, 2012.

Weissman et al., "A simple method for measuring crosstalk in stereoscopic displays" in Proceedings of SPIE Stereoscopic Displays and Applications XXII, vol. 7863, 2011, 11 pp.

Woods, "How are Crosstalk and Ghosting defined in the Stereoscopic Literature?" in Proceedings of SPIE Stereoscopic Displays and Applications XXII, vol. 7863, 2011, 12 pp.

Woods, "Understanding Crosstalk in Stereoscopic Displays," (Keynote Presentation) at 3DSA (Three-Dimensional Systems and Applications) conference, Tokyo, Japan, May 19-21, 2010, 11 pp.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Second Written Opinion from International Application No. PCT/US2013/046404, dated Jul. 25, 2014, 6 pp.

International Preliminary Report on Patentability from International Application No. PCT/US2013/046404, dated Oct. 29, 2014, 7 pp.

* cited by examiner

CROSSTALK REDUCTION IN MULTIVIEW VIDEO PROCESSING

TECHNICAL FIELD

This disclosure relates to techniques for video processing, and more specifically to techniques for multiview video processing.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Extensions of some of the aforementioned standards, including H.264/AVC, provide techniques for multiview video coding in order to produce stereo or three-dimensional ("3D") video. In particular, techniques for multiview coding have been used with the scalable video coding (SVC) standard (which is the scalable extension to H.264/AVC) and the multiview video coding (MVC) standard (which has become the multiview extension to H.264/AVC). SVC and MVC extensions may also be developed for the HEVC standard.

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. Alternatively, the pictures of the two views may be shown in rapid succession, and the user may wear active glasses that rapidly shutter the left and right eyes at the same frequency, but with a 90 degree shift in phase.

SUMMARY

In general, this disclosure describes techniques for multiview video processing. In particular, this disclosure is related to crosstalk and ghosting reduction in multiview video coding.

In one example of the disclosure, a method of processing multiview video includes identifying a first set of pixels in co-located pairs in a corresponding pair of multiview image frames for which the co-located pairs have a disparity between the pixels that is greater than a selected disparity threshold. The method further includes identifying a second set of pixels in at least one of the image frames that are within a selected distance of an intensity transition greater than a selected intensity transition threshold. The method further includes applying crosstalk correction to pixels that are identified as being in at least one of the first set and the second set.

In another example of the disclosure, a computer-readable medium stores executable instructions for a causing a processor to perform multiview video processing. This includes executable instructions for causing a processor to identify a first set of pixels in co-located pairs in a corresponding pair of multiview image frames for which the co-located pairs have a disparity between the pixels that is greater than a selected disparity threshold. This further includes executable instructions for causing a processor to identify a second set of pixels in at least one of the image frames that are within a selected distance of an intensity transition greater than a selected intensity transition threshold. This further includes executable instructions for causing a processor to apply crosstalk correction to pixels that are identified as being in at least one of the first set and the second set.

In another example of the disclosure, an apparatus includes means for identifying a first set of pixels in co-located pairs in a corresponding pair of multiview image frames for which the co-located pairs have a disparity between the pixels that is greater than a selected disparity threshold. The apparatus further includes means for identifying a second set of pixels in at least one of the image frames that are within a selected distance of an intensity transition greater than a selected intensity transition threshold. The apparatus further includes means for applying crosstalk correction to pixels that are identified as being in at least one of the first set and the second set.

The details of one or more examples are set forth in the accompanying drawings and the description below. Other features, objects, and advantages will be apparent from the description and drawings, and from the claims.

BRIEF DESCRIPTION OF DRAWINGS

FIG. 6 and FIG. 7 depict an example of an intermediate stage of crosstalk reduction candidate (CRC) mapping of a matched pair of right view image frame and left view image frame.

DETAILED DESCRIPTION

Figure 1:
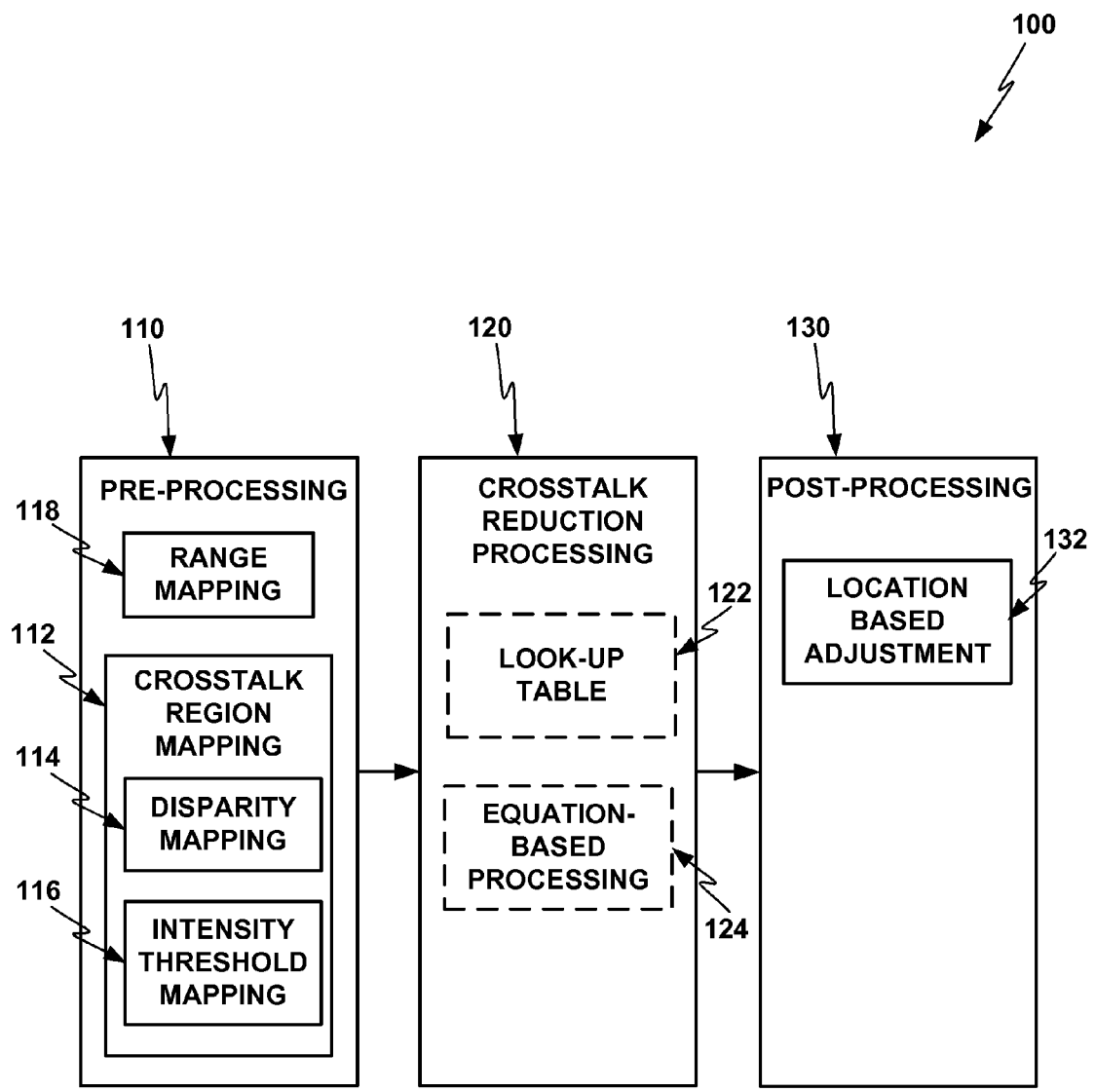
FIG. 1 is a block diagram illustrating an example multiview video processing system.

In general, this disclosure describes techniques for processing multiview video data, e.g., video data used to produce a three-dimensional (3D) effect. In particular, this disclosure relates to techniques to reduce crosstalk and ghosting in multiview video processing. The techniques of this disclosure include identifying differences in intensity between pairs of pixels in an image frame and identifying significant disparity between co-located pairs of pixels in the image frame and a corresponding image frame in a pair of image frames (e.g., left view and right view) used for 3D display, and applying a crosstalk correction parameter based on the identifications, in multiview video processing. The techniques of this disclosure also include identifying pixels that are candidates for crosstalk correction, and applying a crosstalk correction parameter that is based at least in part on which of two or more portions of the image frame the pixel is in.

Generally, to produce a stereoscopic view or three-dimensional (3D) effect in video, two views of a scene, e.g., a left eye view and a right eye view, may be shown simultaneously or nearly simultaneously. Two pictures of the same scene, corresponding to the left eye view and the right eye view of the scene, may be captured from slightly different horizontal positions, representing the horizontal disparity between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect. Other multiview coding may also be performed, such as to provide different perspective views, e.g., left, center, right, worm's-eye, bird's-eye, etc., or to provide different levels of depth suitable for different sizes or resolutions of display screens, for example, with pairs of left and right image frames for each of these different multiview perspectives or depth levels.

Crosstalk is incomplete isolation of the emissive output of the left and right image channels in a 3D or other multiview video system, which causes the luminance dedicated to one of the two image channels to leak into the other image channel. Ghosting is a subjective term for the perception of crosstalk. Ghosting may vary from crosstalk depending on the content of the multiview image. Ghosting, or crosstalk as perceived by the viewer, is a function of the system crosstalk, the disparity between the two views of the image, and the image contrast. The two may be referred to together as crosstalk/ghosting where both are applicable.

For example, a viewer may perceive ghosting in a region of a multiview image when there is a relatively high disparity between the corresponding pixels of a region in the two corresponding multiview image frames, in combination with a relatively high transition in intensity in that region of the two corresponding image frames. The disparity between the two states of a region in the two corresponding multiview image frames is associated with a transition in depth in the multiview image, i.e., a transition between an apparently close-up object and an apparently distant background, while the transition in intensity is a transition in brightness, i.e. a contrast between a bright area of the image and a dark area. The visibility of ghosting therefore increases with increasing depth, i.e. increasing left-right disparity, and with increasing transition in brightness, i.e. a sharp contrast between adjacent light and dark areas. The visibility of ghosting also increases with increasing backlight level, where a higher backlight level causes a lower level of background black.

Crosstalk/ghosting is one of the most important quality attributes that affects 3D picture quality, in both 3D videos/movies and 3D gaming. Side effects of crosstalk/ghosting may include loss of 3D effect, loss of depth resolution, loss of image contrast, and viewer discomfort. Some reports have indicated that perceptible ghosting effects and degradation of 3D visual quality typically begins to occur when system crosstalk reaches a level in a range of 2 to 6%.

There may be a lot of non-uniformity on 3D displays, such that applying one crosstalk method on all the pixels displayed on the screen might introduce crosstalk instead of reducing it. Techniques of this disclosure may illustratively include display processors that perform two-dimensional, location-based crosstalk adjustment. This may provide better quality crosstalk correction than simply applying uniform crosstalk correction on all pixels on a screen.

The preprocessing module may provide an extra layer of quality protection by identifying areas that would really benefit from crosstalk reduction, which may include only a relatively small proportion of an image frame, and only applying crosstalk reduction in those areas. In some examples, this relatively small proportion of the image frame the preprocessing module identifies as targets for crosstalk reduction may involve 10 to 15% of the pixels in the image frame. Only applying crosstalk reduction to a potentially relatively small proportion of an image frame may impose a low burden on bandwidth and processing sources and therefore allow crosstalk reduction to be applied without resorting to bandwidth reduction techniques that might involve using lower quality reference frames or using the wrong indexes for look-up tables. Only applying crosstalk reduction to a potentially relatively small proportion of an image frame may also require fewer hardware cycles and may help save hardware area.

FIG. 1 is a block diagram illustrating an example multiview video processing system 100. A particular example of the multiview video processing techniques of this disclosure is shown in the high-level schematic block diagram of multiview video processing system 100 in FIG. 1, which is described with reference to illustrative examples as follows. In the example of FIG. 1, multiview video processing method 100 includes pre-processing block 110, crosstalk reduction processing block 120, and post-processing block 130. "Crosstalk reduction" and "crosstalk correction" are used interchangeably throughout this disclosure, and in either case, may illustratively refer to an effect, measure, or parameter applied to reduce, compensate for, eliminate, cancel, or correct for crosstalk/ghosting.

Pre-processing block 110 includes range mapping module 118 and crosstalk region mapping module 112, in this example. Crosstalk region mapping module 112 includes disparity mapping module 114 and intensity transition mapping module 116. Disparity mapping and intensity transition mapping may be performed in any order. Post-processing block 130 includes location based adjustment module 132. Multiview video processing system 100 may be implemented in the form of a method, a device, an apparatus, a means for performing a function, an integrated circuit or a set of integrated circuits (e.g., a chip set), a computer-readable medium, or a combination thereof, in various examples. In the context of multiview video processing system 100 of FIG. 1, a "processing block" or "block" or "module" may refer to a step or set of steps in a method, or a module or portion of a device, apparatus, means for performing a function, or computer-readable medium that performs or processes the indicated functions.

To the extent that a module is implemented with software, the software executes on one or more hardware elements and is not to be considered software per se.

In crosstalk region mapping module 112 of pre-processing block 110, disparity mapping module 114 may perform a comparative analysis of a pair of corresponding left and right multiview image frames for the same temporal position, and generate a map that identifies pixels or regions of pixels in the pair of corresponding left and right multiview image frames that have relatively high disparity between the two frames, that cause a large perceived depth transition. Intensity threshold mapping module 116 may analyze pairs or sets or regions of pixels within an individual frame, and generate a map that identifies pairs of pixels within a frame that have a relatively high intensity threshold, e.g., that have a bright area and a dark area proximate to each other in the image frame. The intensity threshold in an example of 8-bit images may, for example, be a transition of 10 between co-located pixels. Other threshold values may also be used in other examples, such as a transition of 20, 40, or 80 in 10-bit images, or a transition of 80, 160, or 320 in 12-bit images. These are merely illustrative values, and other values may also be used in other examples. Pre-processing block 110 may also include range mapping module 118, which may identify values of the backlight or level of background black applicable to regions or pixels of an image frame.

Crosstalk reduction processing block 120 generates initial crosstalk correction parameters or values for the pixels of an image frame, and may accomplish this in a variety of ways. In some examples, crosstalk reduction processing block 120 uses the option of a 2D look-up table (LUT) 122 in which the look-up table is characterized by display measurements. This technique may pose a relatively lower processing burden. In some examples, crosstalk reduction processing block 120 uses the option of equation-based processing 124. This technique may enable crosstalk reduction processing block 120 to generate initial crosstalk correction with relatively higher precision and requiring less data storage space, in some implementations.

Post-processing block 130 may use any of a variety of techniques to modify the crosstalk correction parameters for the pixels of an image frame. For example, post-processing block 130 may adjust the crosstalk reduction parameters as a function of the location of the pixel in the image frame, and correspondingly, the location of the pixel on a screen or display on which the image may be rendered. Crosstalk and ghosting may occur differently in portions of an image frame or based on which portions of a screen or display on which a portion of an image is rendered. Post-processing block 130 may specifically modify the crosstalk correction parameters to take into account and compensate for this location-based differential crosstalk, i.e., the differences in crosstalk between different portions of the image frame.

Various aspects of multiview video processing system 100 as shown in FIG. 1 are further described below and depicted in the corresponding figures.

The techniques of this disclosure may be described with reference to the multiview video coding (MVC) extension of the H.264/AVC (advanced video coding) standard, as an illustrative example of how the techniques of this disclosure may be implemented. The latest joint draft of MVC is described in JVT-AD007, "Editors' draft revision to ITU-T Rec. H.264|ISO/IEC 14496-10 Advanced Video Coding," 30th JVT meeting, Geneva, Switzerland, January-February 2009, available from http://wftp3.itu.int/av-arch/jvt-site/2009_01_Geneva/JVT-AD007, which is hereby incorporated by reference. While techniques of this disclosure may be described in terms of H.264/AVC, it should be understood that the techniques of this disclosure may be applicable for use with other multiview video coding processes, or with future multiview extensions to currently proposed video coding standards.

Coding of two views may also be supported by MVC. One of the advantages of MVC is that an MVC encoder may take more than two views as a 3D video input and an MVC decoder may decode such a multiview representation. So, any renderer with an MVC decoder may be configured to handle 3D video content with multiple views. In MVC, inter-view prediction is accomplished by allowing prediction among pictures in the same access unit (i.e., within the same time instance or temporal position). When coding a picture in one of the non-base or non-reference views, a picture may be added into a reference picture list if it is in a different view but within the same time instance. An inter-view prediction reference picture can be put in any position of a reference picture list, just like any inter prediction reference picture.

Figure 2:
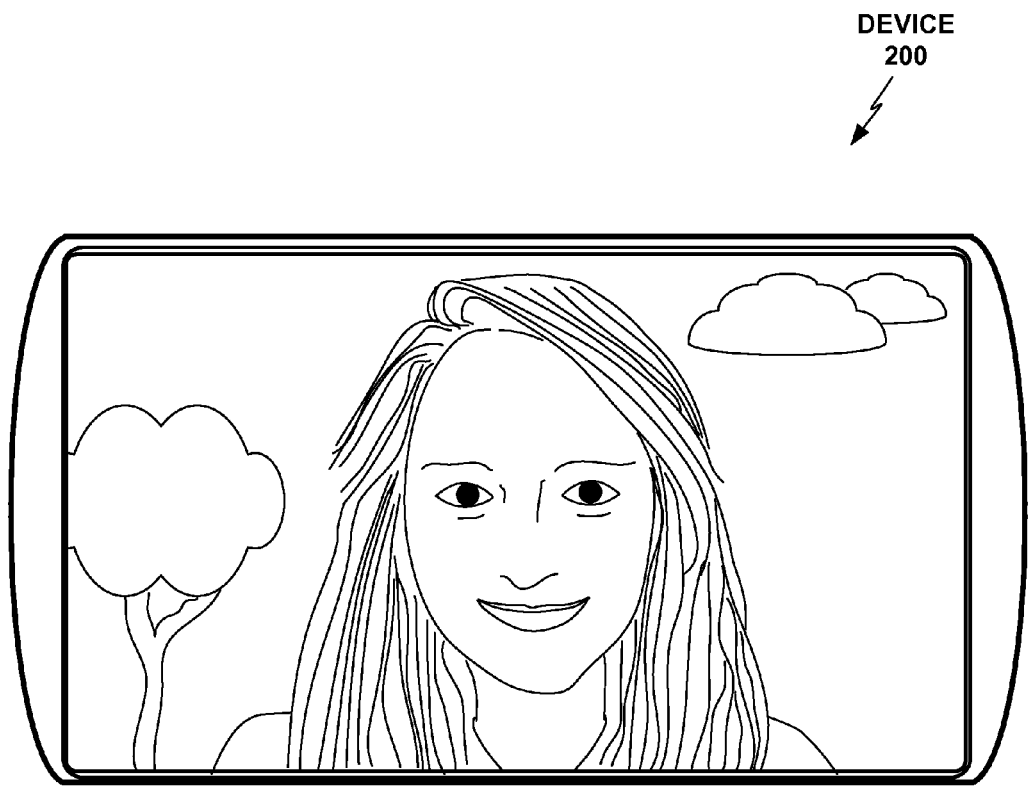
FIG. 2 depicts an example device that is capable of playing videos and/or rendering images.

FIG. 2 depicts an example device 200 that is capable of playing videos and/or rendering images. As depicted in FIG. 2, device 200 is displaying an image that may be 3D image rendered as a pair of corresponding multiview image frames in accordance with any of a variety of multiview display techniques as described above. Device 200 as shown in FIG. 2 may implement all or part of multiview video processing system 100 as shown in FIG. 1. The image being rendered on device 200 may be one 3D image in a series of 3D images forming a 3D video output, which may be a movie, a video clip, a T.V. show episode, a video game output, video conferencing output, or any other type of live or pre-recorded video. Device 200 may display the 3D video output based on a streaming input signal being transmitted over a wireless or hard-line network or transmission medium, or based on a locally stored video file that may be stored more or less in its entirety on a more or less local storage medium, and may previously have been downloaded and written to that storage medium. Device 200 may take the form of any of a variety of devices such as a smartphone, a tablet computer, a television, a computer monitor, a media player, a video gaming device, a monitor connected to a video gaming console, or any other kind of device capable of rendering 3D video or multiview video. Device 200 as shown in FIG. 2 provides a context for 3D video rendering and processing as described with reference to the subsequent figures.

Considering an example of the pre-processing block 110 as shown in FIG. 1, pre-processing block 110 may scan pixel intensity values, such as luminance values, of pixels in an image frame to generate a crosstalk region map of the image frame. Generating the crosstalk region map of the image frame includes identifying pixels that are candidates for causing crosstalk between the image frame and a corresponding image frame in a multiview image system, such as the corresponding left and right image frames in a 3D video system, and that are candidates for applying crosstalk cancellation. For example, two corresponding 3D image frames for the image being rendered on device 200 in FIG. 2 are shown in FIGS. 3 and 4.

Figure 3:
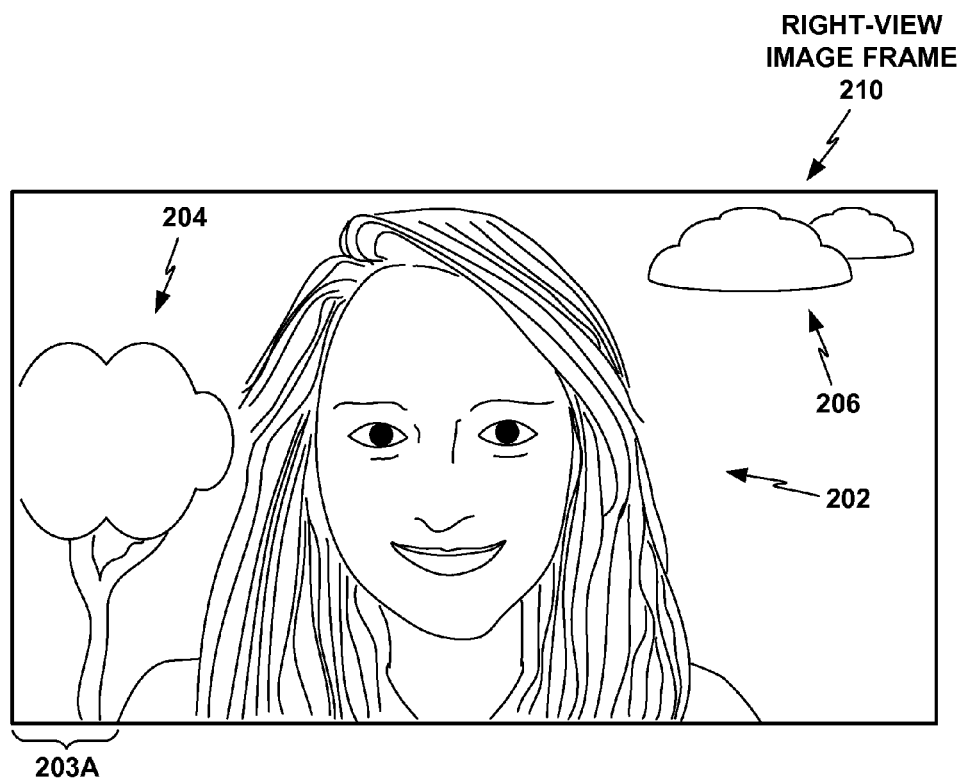
FIGS. 3 and 4 illustrate a pair of corresponding image frames that may be displayed simultaneously in different views in a multiview video.
Figure 4:
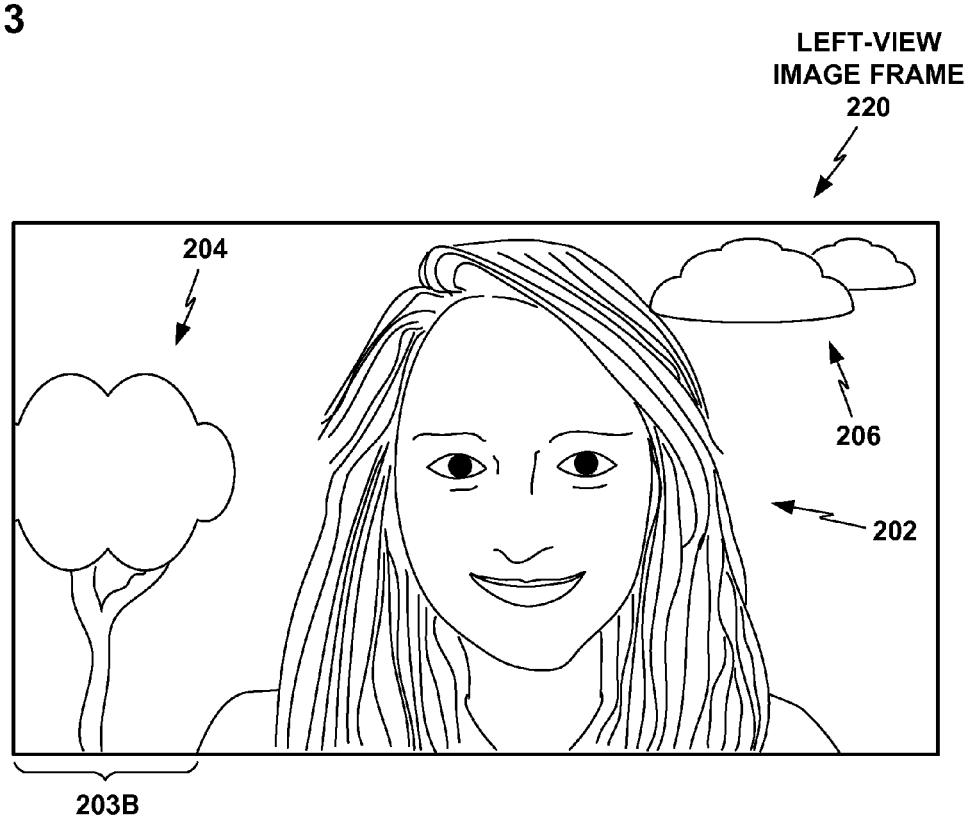

FIGS. 3 and 4 illustrate a pair of corresponding image frames 210 and 220 that may be displayed simultaneously in different views in a multiview video. FIG. 3 shows a right view image frame 210, and FIG. 4 shows a left view image frame 220, that together may correspond to the 3D image rendered on device 200 in FIG. 2. In right view image frame 210, foreground character 202 is positioned leftward compared to background objects 204, 206, while in left view image frame 220, foreground character 202 is positioned rightward compared to background objects 204, 206. Thus, when right view image frame 210 is exposed to a viewer's right eye at the same time or within a sufficiently proximate point in time that the left view image frame 220 is exposed to a viewer's left eye, the two frames 210, 220 together cause the viewer to perceive a three-dimensional image out of the combination of the two image frames. A pair of image frames may be considered to be an effectively simultaneous pair of image frames, or effectively occurring at the same temporal position, if the pair of image frames is displayed in rapid succession in coordination with an active 3D viewing device that alternates the view of a viewer's eyes, such that the viewer perceives the two image frames at effectively the same time, for example. When device 200 renders a rapid succession of 3D pairs of image frames, the viewer may perceive the succession of pairs of image frames as a 3D video.

The differential left-right positioning of the foreground character 202 relative to the background objects 204, 206 in image frames 210 and 220 may be illustrated by comparing the displacement of the lower-left edge of foreground character 202 at the bottom of the image frame from the lower-left corner of the image frame. This displacement 203A in right view image frame 210 is relatively small, while this displacement 203B in left view image frame 220 is significantly greater relative to displacement 203A in right view image frame 210. The combined image depicted in FIG. 2 as being rendered by device 200 shows foreground character 202 in a relatively intermediate position to represent the perception of a viewer, while foreground character 202 is not actually positioned in the intermediate position shown in FIG. 2 in any single real image frame. The example shown in FIGS. 3 and 4 is a simplified example, and in other pairs of 3D images, various objects and portions of objects may be rendered to appear at any apparent depth in a continuous range of depth, just as in viewing the actual three-dimensional world.

Device 200 may include or have access to a multiview video processing system such as system 100 as shown in FIG. 1, or other implementation. Device 200 may incorporate hardware and/or software elements constituting all of system 100, or all or portions of system 100 may operate or be positioned at other locations and may be in communicative connection with device 200 so that system 100 is accessible to device 200. An example is described as follows in which system 100 operates on behalf of device 200, where system 100 may be incorporated in or be accessible to device 200.

System 100 may apply crosstalk reduction techniques when processing right view image frame 210 and left view image frame 220, such as after decoding the image frames. In an example of system 100 rendering the image frames, system 100 may identify crosstalk candidate pixels using two criteria. Crosstalk/ghosting is more visible when there is inter-image disparity between the left and right images in a corresponding pair of images, corresponding with transitions in depth between foreground objects and the background, so system 100 may evaluate inter-image disparity as the first criterion. Crosstalk/ghosting is also more visible in sharp transitions in intensity, e.g., at an edge between a dark area and a bright area within a single image frame, so system 100 may evaluate intensity transitions as the second criterion. System 100 may evaluate for intensity transitions in luminance, as well as in one or more chrominance values or some other pixel intensity value. System 100 may evaluate and/or map inter-frame disparity and intra frame intensity transition in any order, e.g., system 100 may map inter-frame disparities and then intra frame intensity transitions, or intra frame intensity transitions and then inter-frame disparities.

Figure 5:
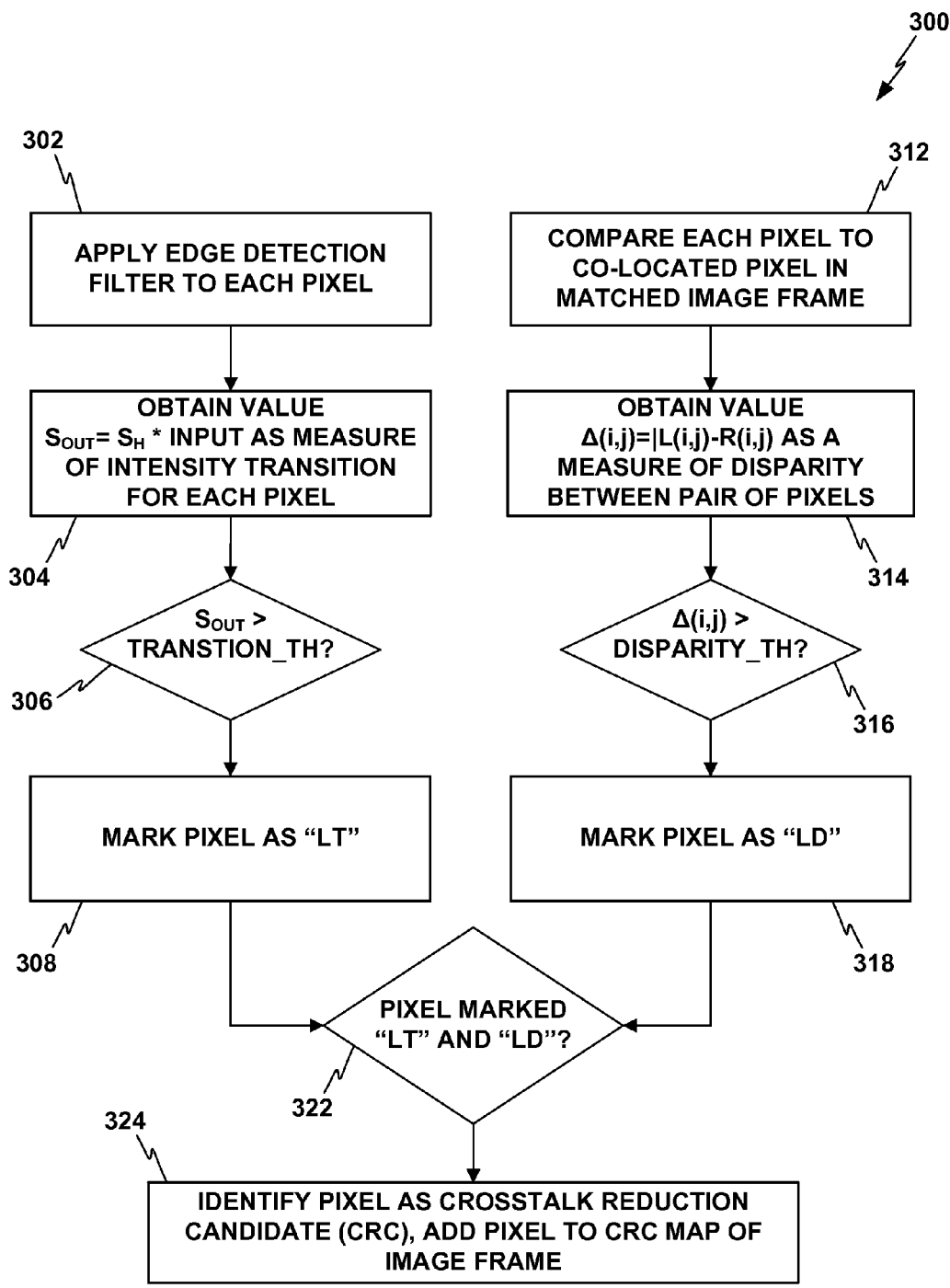
FIG. 5 depicts a flowchart for an example process for multiview video processing.

FIG. 5 depicts a flowchart for an example process 300 for multiview video processing. System 100 may use a process 300 (implemented in software, hardware, or a combination thereof) to generate a crosstalk/ghosting map (referred to going forward as a "crosstalk map"), as shown in FIG. 5. The process 300 performed by system 100 may evaluate intensity transitions among proximate pixels (i.e., pixels proximate to one another) within a given image frame, i.e., intra frame intensity threshold detection, as well as evaluating disparities between pixels in the same positions between two corresponding, temporally matched image frames giving the left and right views of a 3D pair of image frames, i.e., inter frame disparity detection. The intra frame intensity threshold detection component of the process 300 may correspond with intensity threshold mapping block 116 of FIG. 1, and the inter frame disparity detection component of the process 300 may correspond with disparity mapping block 114 of FIG. 1. The inter frame disparity detection portion of the process 300 and the inter frame disparity detection of the process 300 may be performed in any order, including an overlapping or simultaneous order.

Figure 7:
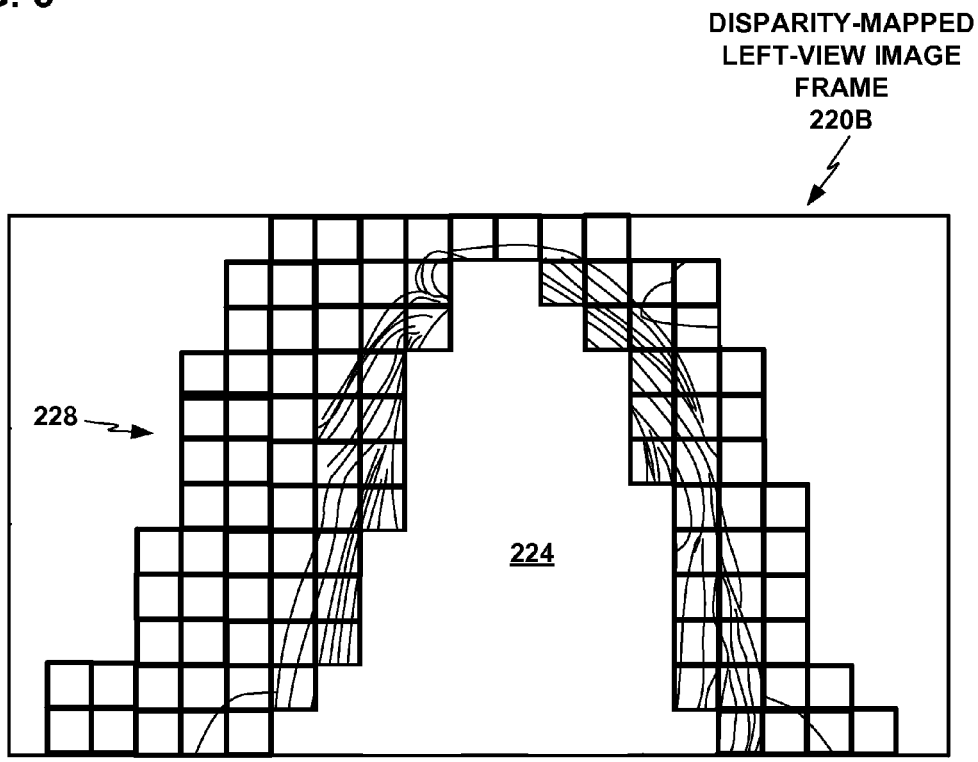

In the example illustrated in FIG. 7, system 100 applies an edge detection filter $S_H$. An example filter mask may apply an edge detection filter to each pixel (302) to obtain a value $S_{out}$ (304), which is a measure of the transition in intensity for each pixel, where $S_{out}=S_H*$Input. For example, an edge detection filter of $S_H$[-1 0 1] may be applied. Other examples may use edge detection filters of varying lengths and forms. If $S_{out}$>Transition_TH, where Transition_TH is a predetermined or previously selected transition threshold (306), system 100 marks the pixel as "LT" for "large transition" (308). System 100 may separately evaluate for transitions in intensity in luminance, chrominance, or other pixel intensity values. Evaluation of transitions in luminance will be described for purposes of illustration. System 100 may apply this filter to every pixel within the row length of a given pixel, and if $S_{out}$ for any of those pixels is greater than the transition threshold, system 100 may mark the given pixel as LT.

In evaluating for intensity transitions, system 100 may evaluate for large transitions within a one-dimensional (1-D) neighborhood of a selected row length (measured in number of pixels) of a current or given pixel under evaluation. For example, for a given pixel, system 100 may evaluate the other pixels in the same row as the given pixel out to a selected row length of 32 pixels, or 64 pixels, or 128 pixels, or some other length of pixels on either side of the given pixel under evaluation. System 100 may measure the intensity transition between a given pixel and the other pixels within the selected row length around the given pixel by any of a number of measures. System 100 may optimize the intensity threshold detection process by combining processing of intensity measurements in pixel rows as applied to each pixel within the row, to avoid duplication of processing and constrain algorithmic complexity.

For example, system 100 may determine which other pixel within the selected row length of the given pixel has the maximum difference in value of luminance, chrominance, or other intensity measure from the selected pixel, and may take that maximum difference as the intensity delta for the given pixel. System 100 may then compare the intensity delta of the given pixel with a selected intensity transition threshold, which may be stated in the same measure as the intensity delta, e.g., luminance, chrominance, or other intensity measure, and if the intensity delta for the given pixel is above the selected intensity transition threshold in that measure, system 100 may mark the given pixel as "LT" for large transition, i.e., a high intensity transition. System 100 may also use a variety of other techniques for designating pixels as having a high intensity transition, such as using a sliding threshold in combination with pixel row distance, for example, that includes applying a variable selected threshold that is relatively smaller for shorter pixel separation and is relatively larger for greater pixel separation up to the end of the selected pixel row length. Pixels marked as "LT" may be considered as candidates for crosstalk correction, when considered in combination with differences in inter frame disparity. A pixel may be marked as LT if either its $S_{out}$ exceeds the threshold, or at least one other pixel within the selected row length of the given pixel has an $S_{out}$ that exceeds the threshold.

System 100 may also compare each given pixel with the corresponding pixel in the same, co-located position in the other image frame in the temporally matched, left/right pair of image frames (312). As with the intensity transitions, system 100 may also evaluate luminance, chrominance, or some other value in the pixels. System 100 may evaluate the difference between the two co-located pixels in corresponding left and right image frames and obtain a value $\delta(i,j)=|L(i,j)-R(i,j)|$ as the inter-pixel disparity (314). In this example, L(i, j) indicates the intensity of the left view pixel and R(i, j) indicates the intensity of the right view pixel, where such pixels are at co-located positions within the respective views. System 100 may evaluate whether the disparity is greater than a disparity threshold Disparity_TH, i.e. $\delta(i,j)=|L(i,j)-R(i,j)|>$Disparity_TH (316), and if so, system 100 marks the corresponding pixel as "LD" for "large disparity" (318). That is, "disparity" may refer to inter-view intensity difference in a collocated or matching pixel position between inter-view image frames, i.e., at matching or corresponding pixel positions in the image frames for different views at the same point in time.

System 100 may then compare for pixels that are marked both "LT" and "LD" (322), and for pixels marked as both, system 100 may identify these pixels as crosstalk reduction candidates (CRC) and add these pixels to a map of the crosstalk reduction candidates on the image frame (324).

Figure 6:
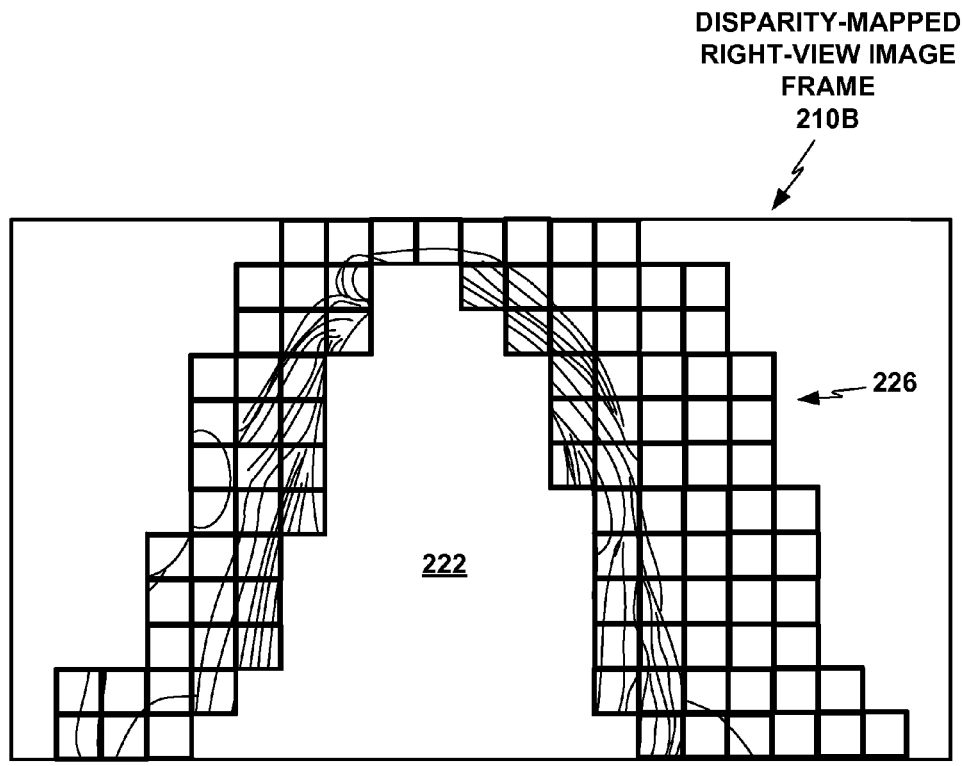
FIGS. 6 and 7 conceptually depict a processing stage for a pair of corresponding image frames that may be displayed simultaneously in different views in a multiview video/

FIG. 6 and FIG. 7 depict an example of an intermediate stage of crosstalk reduction candidate (CRC) mapping of the matched pair of right view image frame 210 and left view image frame 220, here labeled 210B and 220B. In particular, FIGS. 6 and 7 show a simplified view of intermediate results of a disparity comparison between the two image frames maps of pixel blocks in portions of the image frames of the matched 3D pair of image frames. These pixel blocks are areas in which the crosstalk region mapping/pre-processing as described above identifies both LD and LT pixels, including pixels within a selected distance of intensity transitions. Other examples of the CRC mapping may include only horizontal rows around the candidate pixels rather than whole pixel blocks, though in the example depicted in FIGS. 6 and 7, pixel blocks are identified surrounding and proximate to pixels identified as having large inter-frame disparity, and accordingly marked as "LD". Each pixel block may contain one or more and potentially up to a large number of pixels identified as both LD and LT and therefore identified as targets for crosstalk reduction. Each pixel block may illustratively extend to 32, 64, 128, or some other number of pixels to either side of each crosstalk reduction candidate pixel, for example, and a typical crosstalk reduction candidate (CRC) mapping may be more complicated than the simplified depiction of FIGS. 6 and 7. The inter-frame disparity processing may include a capability of detecting large image portions with translational non-disparity (i.e. non-disparity or lack of inter-frame contrast of translational displacement), shown at 222 and 224, and omitting those portions from the disparity map. The disparity analysis processing also detects some image portions, shown at 226 and 228, that have disparity but do not have any sharp intensity transitions, such that the intensity transition analysis processing will omit these image portions from being marked for a large intensity transition. Therefore, these regions may be marked LD but not LT. In some examples, these pixels marked as LD but not LT are processed as candidates for crosstalk reduction. In other examples, only regions marked both LD and LT are processed as candidates for crosstalk reduction.

Figure 8:
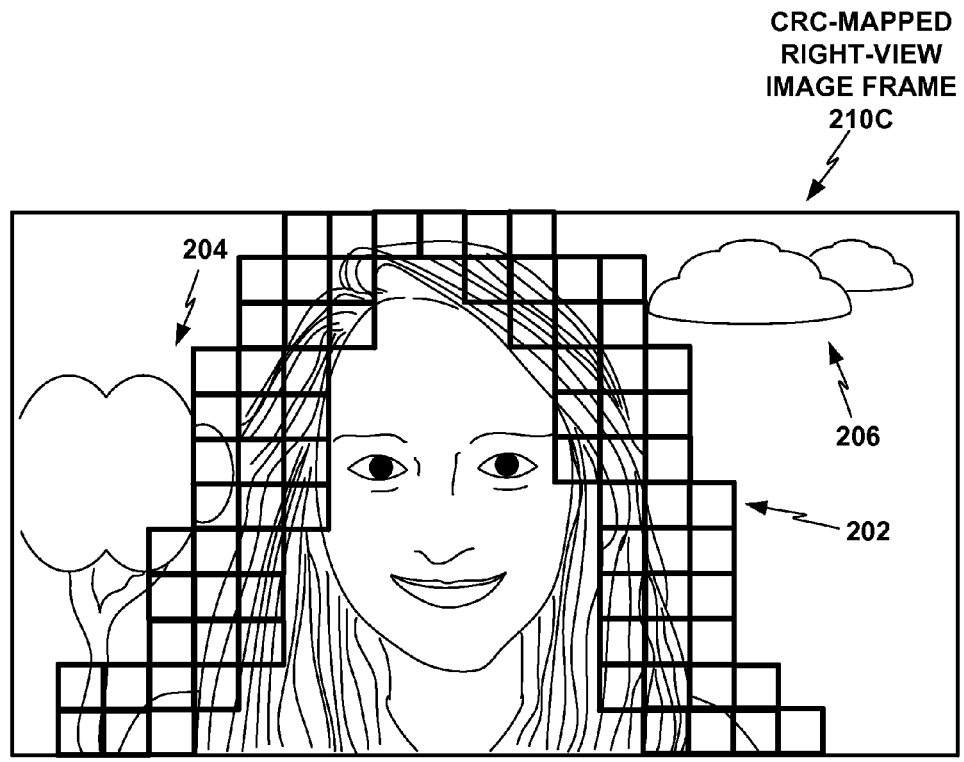
FIG. 8 and FIG. 9 depict simplified illustrations of crosstalk reduction candidate (CRC) mapping in a matched pair of right view image frame and left view image frame after both disparity mapping and intensity transition mapping.
Figure 9:
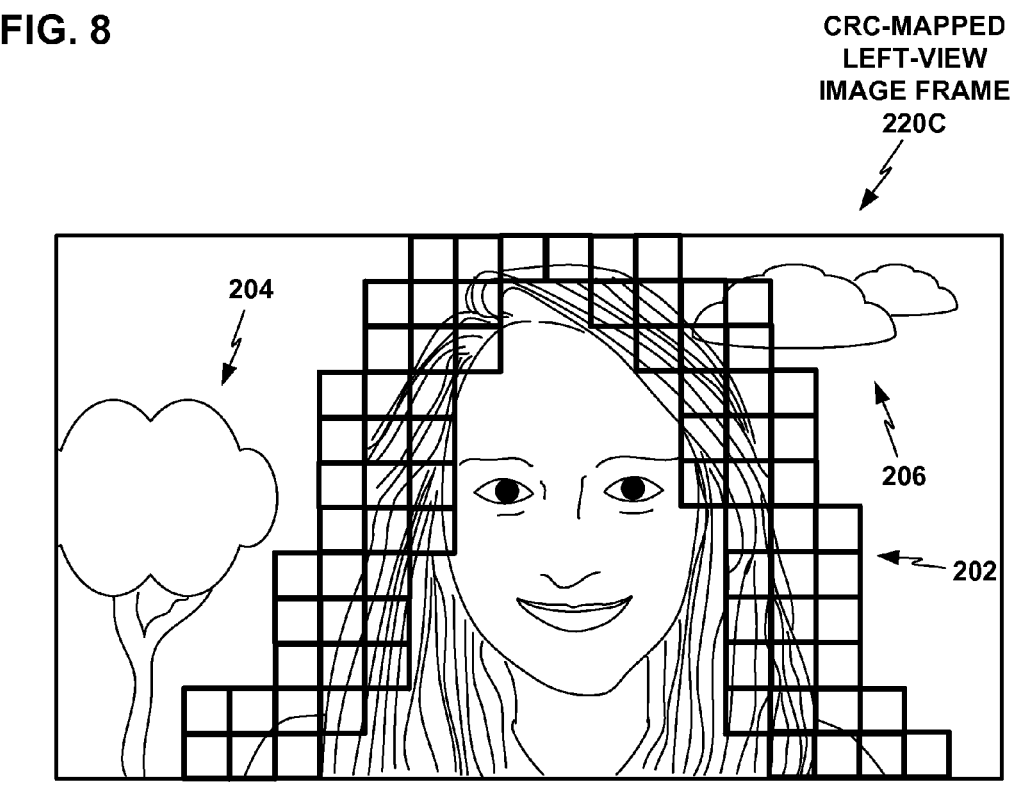

FIG. 8 and FIG. 9 depict simplified illustrations of the crosstalk reduction candidate (CRC) mapping in the matched pair of right view image frame 210 and left view image frame 220, here labeled 210C and 220C, after both disparity mapping and intensity transition mapping (which may be performed in any order, including in parallel or in overlapping order). Right view image frame 210C shows representative pixel blocks in portions of the image frame that are found to have both large intensity transitions and large disparity between the two matched image frames 210C and 220C of the matched 3D pair of image frames. Similarly, left view image frame 220C shows representative pixel blocks in portions of the image frame that are found to have both large intensity transitions (LT) and large disparity (LD) between the two matched image frames 210C and 220C of the matched 3D pair of image frames. While relatively large representative pixel blocks are depicted for the sake of a simplified view in FIGS. 8 and 9, various examples may apply intensity transition threshold and disparity threshold filters on a pixel-by-pixel basis. Additional pixels may also be included as crosstalk reduction processing candidates for being within a selected distance of intensity transition candidates, where the distance may be linear within a row or column, or rectangular within a rectangular block of rows and columns, or circular within a radius R defined as the square root of a sum of row squared and column squared (e.g., sqrt($M^2 \times N^2$)), or within an elliptical function (e.g., $PF_1+PF_2=2a$), or any other function, in various examples.

Figure 10:
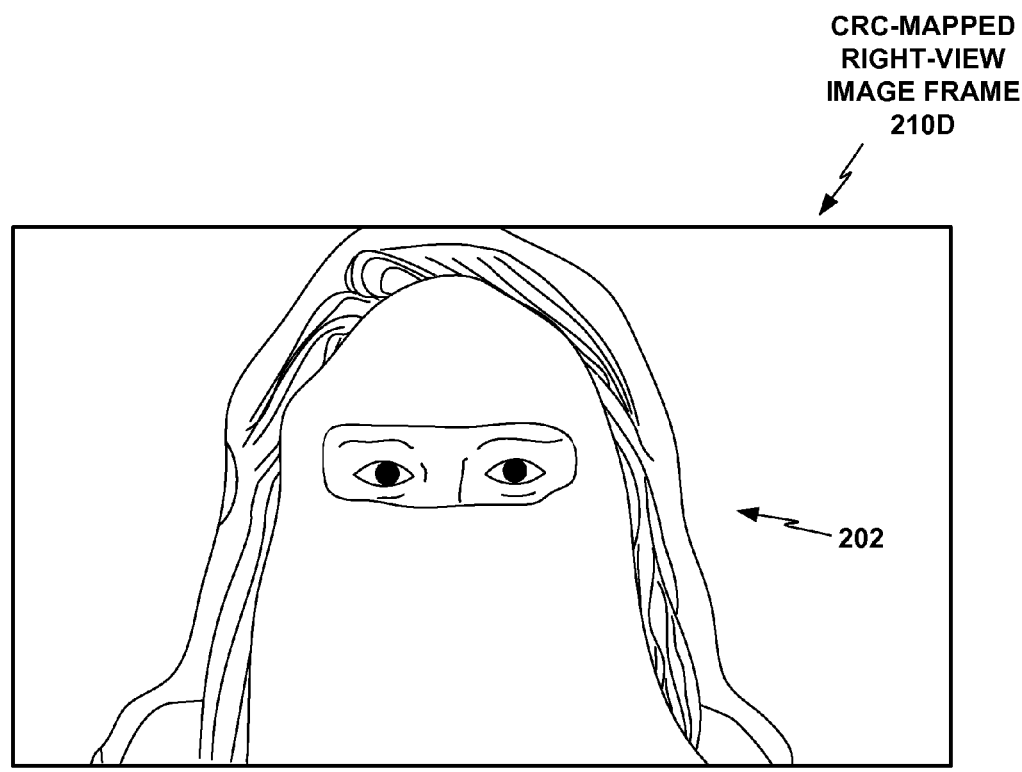
FIG. 10 and FIG. 11 depict additional illustrations of crosstalk reduction candidate (CRC) mapping in a matched pair of right view image frame and left view image frame after both disparity mapping and intensity transition mapping.
Figure 11:
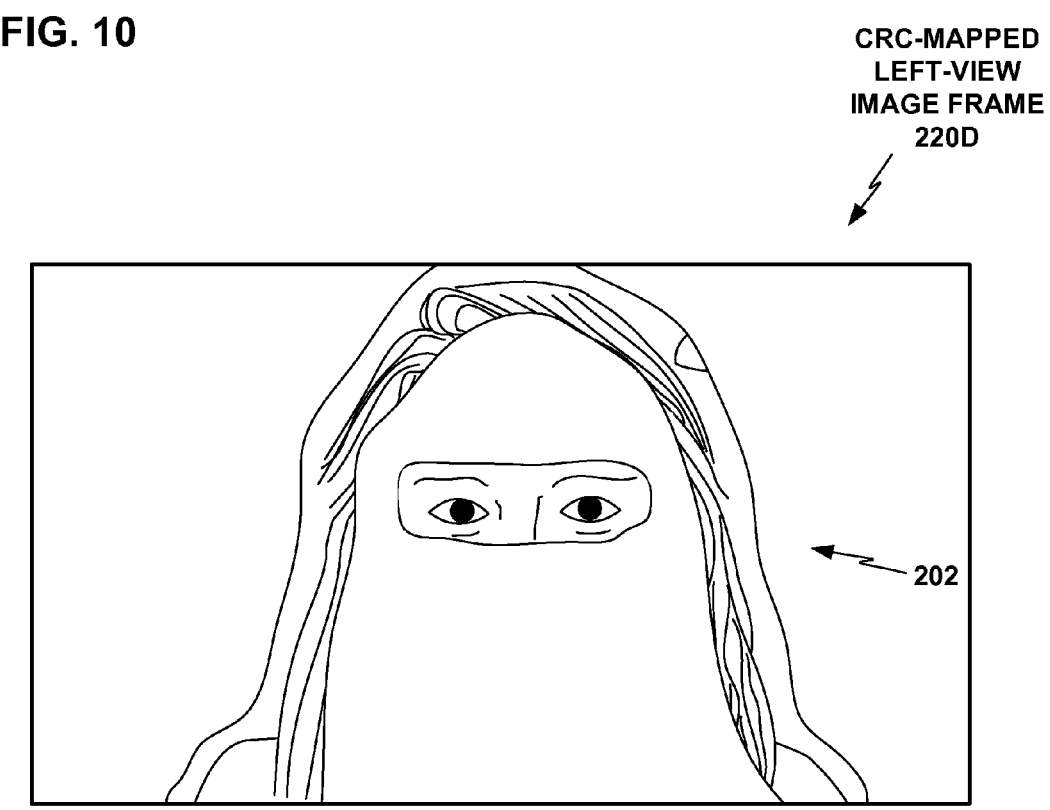

FIG. 10 and FIG. 11 depict additional illustrations of the crosstalk reduction candidate (CRC) mapping in the matched pair of right view image frame 210 and left view image frame 220, here labeled 210D and 220D, after both disparity mapping and intensity transition mapping, on a finer-scale, pixel-by-pixel basis that is small-scale enough relative to the image size that it may appear continuous at this scale. The groups of pixels 210D and 220D may be those pixels that have been identified as having a disparity between pixels in co-located pairs of pixels between the two image frames that are greater than a selected disparity threshold, and as being within a selected distance of an intensity transition that is greater than a selected intensity transition threshold. The distance to intensity transitions may be evaluated within a circular range of each pixel in this example, such as may be measured as the square root of the sum of a horizontal pixel distance squared and a vertical pixel distance squared.

As indicated above, other examples of the CRC mapping may include only horizontal rows around the candidate pixels rather than whole pixel blocks, though in the example depicted in FIGS. 8 and 9, pixel blocks are identified surrounding and proximate to pixels identified as having both large intra-frame intensity transitions and large inter-frame disparity, and accordingly marked as both "LT" and "LD". The CRC-mapped pixel blocks found to have both large disparity and large intensity transitions generally surround or are proximate to edges between foreground character 202 and the more distant background, including the distinct background objects 204 and 206 as well as the more distant and more featureless background. Depending on the criteria for detecting inter-frame disparity, the crosstalk reduction processing may also flag areas such as the eyes, nose, and mouth of the close-up character as having above the threshold inter-frame disparity between the interview image frames, and therefore also be candidates for crosstalk correction processing, for example, such as with the areas around the character's eyes in FIGS. 10 and 11.

The crosstalk preprocessing module 110 may therefore provide an extra layer of quality protection by identifying only those areas that need crosstalk reduction so that crosstalk reduction can be applied without interfering with bandwidth or the quality of reference frames. The preprocessing stage also uses fewer hardware cycles by identifying certain regions that require crosstalk. The system applies crosstalk correction only on a low percentage of pixels in a frame, so that the process achieves early termination for a current pixel. In some examples, the system may apply crosstalk correction to 10-15% of all pixels in a video content. In other examples, the system may apply crosstalk correction to a greater or smaller percentage of the pixels in a video content.

Once system 100 has applied both the intensity threshold mapping and the disparity mapping to the image frames as shown in FIGS. 8 and 9, system 100 may proceed to crosstalk reduction processing, or system 100 may perform additional pre-processing analysis or steps (e.g., within the scope of pre-processing block 110 as shown in FIG. 1) before proceeding with crosstalk reduction processing. For example, pre-processing block 110 of system 100 may simply designate all pixels marked as both LD and LT for crosstalk reduction processing, or system 100 may perform additional steps for evaluating both the intensity transition and the disparity for candidate pixels before designating them for pre-processing. Pre-processing block 110 of system 100 may also perform range mapping of the image frames, as indicated with range mapping module 118 in FIG. 1, and compare the crosstalk reduction candidate pixels with the range mapping.

This range mapping 118 may be applied to all the pixels in each image frame, prior to other pre-processing steps, or may be applied after other pre-processing steps and/or only to some pixels in the image frames. The range mapping may, for example, involve identifying values of the backlight or level of background black or lower boundary value of luminance applicable to regions or pixels of an image frame, compensating for which may contribute to assuring full crosstalk compensation. For example, luminance and/or chrominance may be valued within a designated digital range of potential values, with the range delimited by a number "n" of bits assigned to the range, such as 10 bits, for example, allowing the luminance, chrominance, or other value for that pixel to have a value bounded by a range of $2^{10}$. However, the total range may be bounded by boundary values, such as coding for the brightest white and the darkest black in luminance values, that do not allow for sufficient margin for the best possible reduction of crosstalk. The boundary values of this n-bit range may also not take full advantage of the range of values that a device or display mechanism, such as device 200, is physically capable of reproducing.

For example, pre-processing block 110 of system 100 may detect a group of pixels in a temporally matched pair of frames which are marked as both LD and LT for large disparity and large intensity transition, but these pixels and their surrounding pixels as a whole also have values that code for a relatively dark area of the image, so that even though they involve a relatively large intensity threshold, one side of that intensity threshold is coded for the lower bound of luminance, i.e., for the darkest black that the pixel intensity protocol is capable of providing. (Other examples may involve other boundary values such as the upper bound of luminance, for example.) This boundary value limit may constrain the capability of the system 100 from preventing crosstalk and ghosting in this group of pixels. In a case such as this, pre-processing block 110 of system 100 may also introduce a code or additional value for going below or above the corresponding n-bit (e.g., 10-bit) range S(p), where S is the range of a pixel p, that is coded as the bounded, complete range in the source code for luminance and/or chrominance. Pre-processing block 110 may apply range mapping to map 10-bit values S(p) outside of their boundary values to values in an extended range, e.g., from [0, 1023]×[0, 1023]−>S(p). Range mapping could be done in a linear or nonlinear fashion. For example, in an example linear case, the new pixel values for a 10 bit image after range mapping could be obtained as follows:

newleftpix=RangeMap+(leftpix*(1024-RangeMap))>>10;

newrightpix=RangeMap+(rightpix*(1024-RangeMap))>>10;

where the value "RangeMap" is an adjustable parameter.

Once pre-processing block 110 of system 100 has evaluated a pair of image frames and marked one or more pixels as LD and/or LT to identify the pixels as crosstalk candidates, and potentially performed any other pre-processing steps such as range mapping, either before or after identifying crosstalk candidate pixels, system 100 may then perform crosstalk reduction, as discussed below.

System 100 may apply any of various techniques to perform crosstalk reduction (e.g., with crosstalk reduction processing block 120). In some examples, crosstalk reduction processing block 120 may use a 2D look-up table (LUT) characterized by display measurements, which may pose a relatively lower processing burden. In some examples, crosstalk reduction processing block 120 may apply equations that handle this function with more precision and require less data storage space. An example of a 17×17 2D look-up table (LUT) is given below:

|  |  | Input 2 = Right Luma Value R | | | | |
| --- | --- | --- | --- | --- | --- | --- |
|  | L | 0 | 63 | ... | ... | ... | 1023 |
| Input 1 = Left Luma Value | 0 | $L_{0,0}$ | $L_{0,63}$ | ... | ... | ... | $L_{0,1023}$ |
|  | 63 | $L_{63,0}$ | ... | ... | ... | ... | ... |
|  | ... | ... | ... | ... | ... | ... | ... |
|  | ... | ... | ... | ... | ... | ... | ... |
|  | 1023 | $L_{1023,0}$ | ... | ... | ... | ... | $L_{i,j}$ |

Other examples may use a 33×33 2D LUT or other $2^n+1$ 2D LUT in various examples. In the example above, the rows correspond to pixel values from left view and columns correspond to pixel values from the right view. Given an input pair (L, R), this LUT table indexes an L value to the row and R value to the column of the table and extracts the new L value which is the crosstalk reduced pixel. In one implementation, the number of LUTs could be 6, i.e., one for each view and one per color component, since crosstalk varies as a function of color component and may not be the same for left and right views. In other implementations different color spaces and different number of LUTs could be used. Additionally, other sized LUTs may be used in addition to 2D LUTs, such as for multiview processing in an N-view multiview system with more than two simultaneous or corresponding image frames corresponding to each point in time, such as image frames for views with different ranges, for different screen sizes, or from different angles. Multiview processing for more than two simultaneous image frames may generally be referred to as N-view multiview processing. For N-view multiview processing, an N-dimensional LUT, or ND-LUT, may be used, with look-up values specified for each of the N-view multiview sets of image frames.

Look-up tables may be specific or customized to each of any various display devices, since each display device can exhibit different crosstalk characteristics. Customized look-up tables may illustratively be derived by using measurement data taken by very precise optical measurements. One example of a measurement setup may involve a display device being placed in front of a luminance measuring device and a set of 3D glasses being positioned at a distance 3H, i.e., three times the diagonal height of display device, to the device under dark room conditions. The measurement device may be pointed to the center of the screen and be controlled via computing device to take measurements remotely. A media player may be connected to the display device to display various test images. The test images may illustratively consist of left and right view images with varying luminance levels. In one example, the number of test images may be 33×33, including 33 left level and 33 right level combinations. Other examples may use more or fewer test images. After measurements are taken, the measurements may be mapped into a look-up table, for example.

Figure 12:
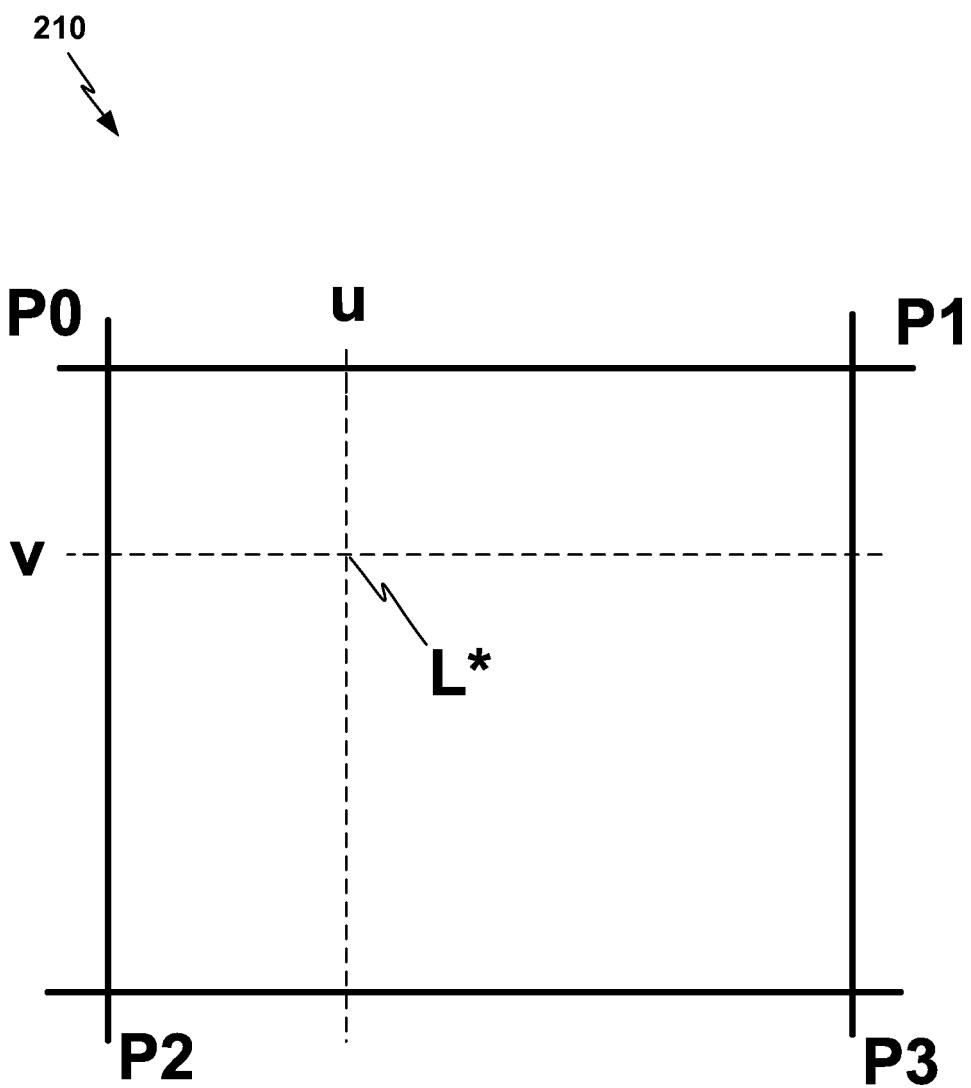
FIG. 12 depicts a 2D look-up table based crosstalk processing block in an illustrative example of a crosstalk reduction process.

For a look-up table, for an original pixel value pair (L, R) from corresponding left and right image frames, the end points of corresponding entries in the look-up table are extracted. For each (L, R) pair, the crosstalk reduction processing block 120 may extract four values (P0, P1, P2, P3) from the 2D LUT for the left image frame, followed by interpolating a new pixel value for the left image frame from the four values (P0, P1, P2, P3) as corner points. Once the crosstalk reduction processing block 120 extracts corner points (P0, P1, P2, P3), it can obtain the new pixel value for the left image frame via bilinear interpolation as follows, and as shown at 210 in FIG. 12:

$$L^* = ((1-u) \times P0 + u \times P1) \times (1-v) + ((1-u) \times P2 + u \times P3) \times v$$

where u and v may be computed by:

$$u = (R-P0)/(P1-P0), v = (L-P0)/(P2-P0)$$

Other examples may use other types of interpolation techniques such as bicubics or splines to obtain new values for crosstalk reduction. Similarly, the crosstalk reduction processing block 120 may extract four points (Q0, Q1, Q2, Q3) from the 2D LUT for the right image frame, and interpolate a new pixel value for the right image frame from the four values (Q0, Q1, Q2, Q3) as corner points.

Crosstalk reduction processing block 120 may also perform crosstalk reduction processing based on curve fitting mathematical processing. The mechanisms for crosstalk and ghosting differ for different types of 3D displays and 3D glasses, and obtaining an accurate crosstalk model mathematically may pose greater processing requirements than processing based on a look-up table. However, in some examples, the hardware area required to store the lookup tables can be large. Different implementations may therefore impose a different balance of constraints between mathematical processing and a look-up table. For example, a stereoscopic display may require six 2D LUTs of a typical size of 33×33. i.e., a look-up table of 33 rows by 33 columns, where six LUTs are needed to provide for three color components in both left and right image frames. Other examples may illustratively use look-up tables of 9×9, or 17×17, or 65×65, or some other pair of values of $2^n+1$ rows by $2^n+1$ columns, the choice of which may illustratively involve a targeted trade-off between image quality, and processing and memory requirements and burdens, within the context of a given display device.

In some examples, crosstalk reduction processing block 120 of system 100 may perform crosstalk reduction processing based on curve fitting mathematical processing, which may enable modeling the crosstalk measurements with fewer parameters to replace look-up tables. A set of fitted curves may be modeled to correspond to columns of the 2D LUT. System 100 may apply a robust fitting algorithm to derive parameters for the fitted curves. Some of the curves may be represented by a simple line, whereas other curves may be represented by piecewise functions, sigmoids, or other functions.

Figure 13:
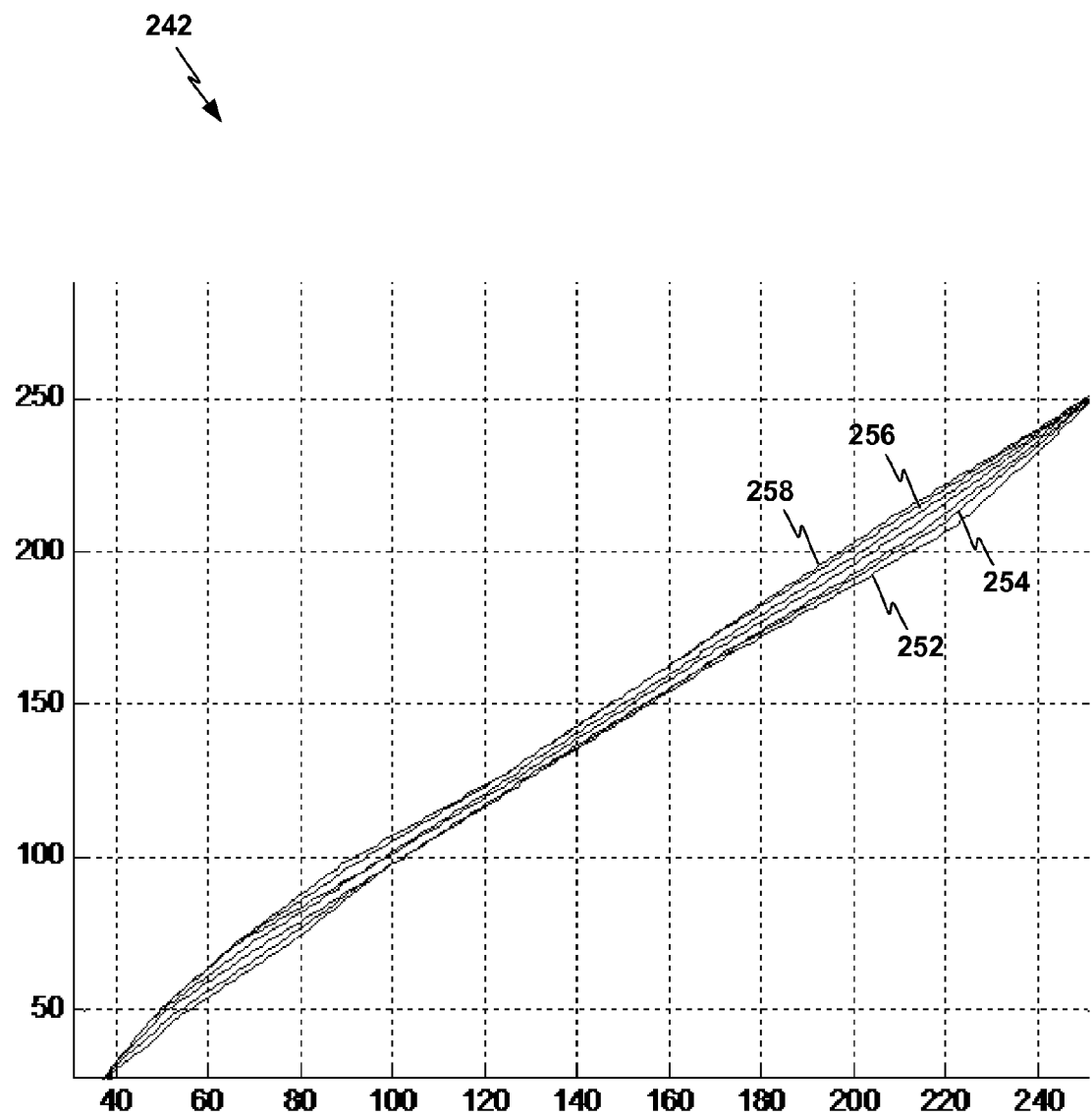
FIG. 13 depicts a curve collection of various examples of fitted curves that may be used to model crosstalk reduction parameters and applying crosstalk reduction to image frames for multiview video processing.

FIG. 13 depicts a curve collection 242 of various examples of fitted curves that may be used to model crosstalk reduction parameters and applying crosstalk reduction to the image frames. Each of the curves in graph 242 corresponds to one column of a look-up table and may replace a look-up table with fewer parameters, and may be based on a given value for the luminance, for example. In the example of graph 242 in FIG. 13, each curve represents the luminance variation in a first view when the other view is fixed at a particular luminance value. For example, when the right view is fixed at 255, graph 242 shows how the luminance of the left view varies for a particular display type. If there were no crosstalk, the curves in graph 242 would simply be linear. As particular examples, graph 242 shows function 252 for the luminance variation in the first view at a value of 48, function 254 for the luminance variation in the first view at a value of 96, function 256 for the luminance variation in the first view at a value of 160, and function 258 for the luminance variation in the first view at a value of 255, as illustrative examples for how luminance of the left view may be varied in relation to the luminance of the right view.

In the example above and other examples, a curve fitting algorithm may generate a simplified parameter set for each of the fitted curves. Modeling the crosstalk reduction parameters with relatively simplified parameters representing fitted curve functions such as lines, piecewise functions, sigmoids, or other functions may enable accurate crosstalk reduction with relatively restrained requirements for both processing and data storage. For example, a curve may be fit into ax+b, a/(b+c*exp(−x)) or other sigmoid functions. In other examples, a curve may be divided into multiple segments, such as three different segments for center, bottom and top portions, respectively. Each of three or another number of segments may be fitted into a different type of curve, and each curve may be represented by a relatively small or compact number of parameters, such as three or six parameters, for example, instead of keeping all 33 values in a 33×33 LUT example.

Crosstalk reduction processing may also be complicated by levels of crosstalk that vary as a function of screen location. One 2D LUT that is populated with crosstalk correction values measured from the center of the screen may not be adequate enough to reduce all the crosstalk that is present in different locations of the screen. System 100 may address and counteract this complication with location-based adjustment, as shown with location-based adjustment processing block 132 in FIG. 1. Location-based adjustment processing may be further described with reference to FIG. 14.

Figure 14:
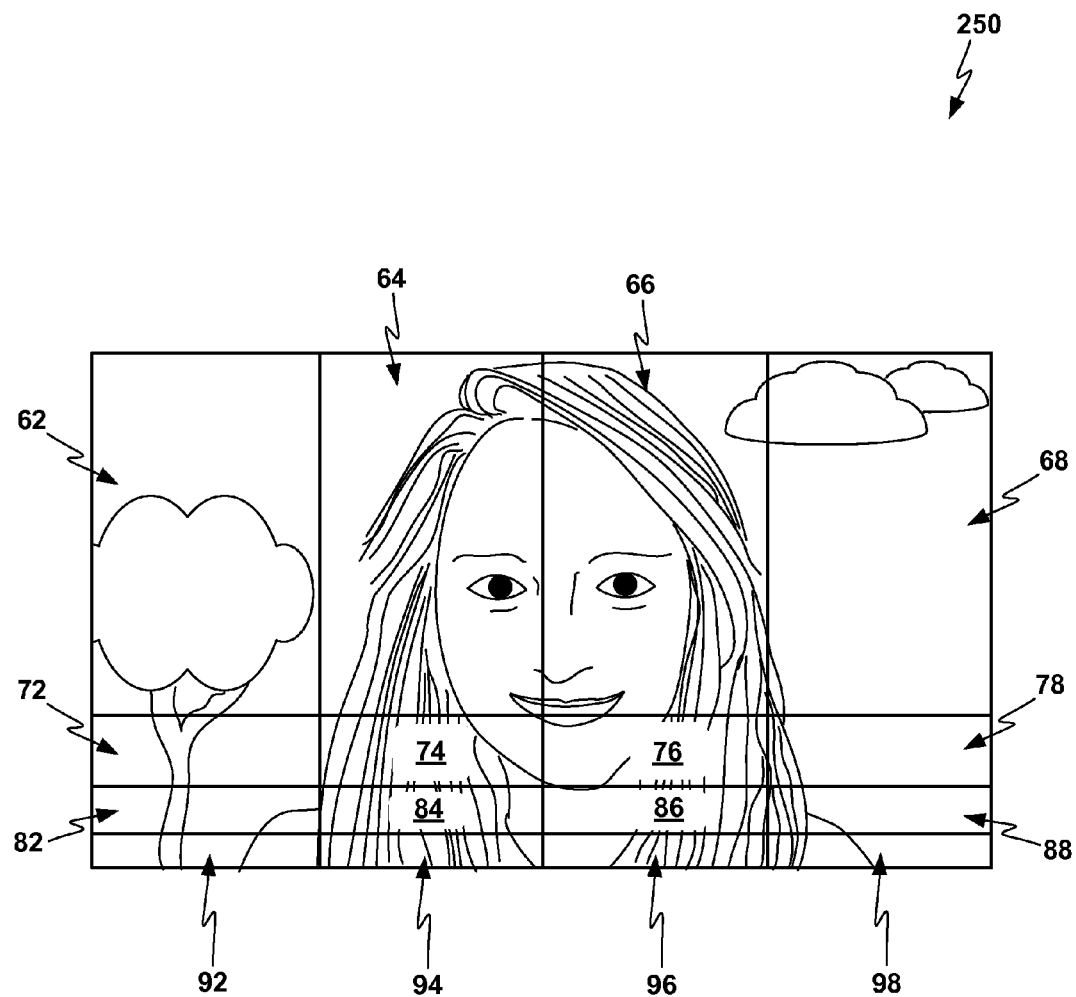
FIG. 14 shows an example of image frame divided into an array of different regions for which different location based adjustment may be performed for multiview video processing.

FIG. 14 shows an example of image frame 250 divided into an M×N array of different regions for which different location based adjustment may be performed for multiview video processing, for which M and N are both integers. This example is illustratively shown dividing the image frame 250 into a 4×4 array with regions 62-98. In this example, therefore, the M×N array is an N×N array where M=N=4. Other examples may involve dividing an image frame into M×N or N×N arrays using values of M and/or N of between 2 and 8, or any other M×N or N×N array with any number of different values of M and N. Still other examples may involve applying differential regions in non-rectangular forms such as circles, ellipses, or other shapes, for example. These examples may include defining portions of the image frame in non-rectangular forms such as circles, ellipses, or other shapes, for example, and applying location-based adjustment is based at least in part on which of two or more circular, elliptical, or other non-rectangular portions of the image frame the pixel is in. System 100 may modify the crosstalk reduction it applies to each of the individual regions 62-98 to compensate for differential magnitude of crosstalk effects in different regions of the image. A 4×4 array may be used for a practical display processor implementation, for example, though the size of the array that system 100 applies may be generalized to any other size. System 100 may apply location-based adjustment differentially to a left image frame and a right image frame to compensate for any crosstalk effects that occur differentially between the two matched image frames.

In one example, a location-based fractional adjustment factor may be applied in post-processing to the output of the look-up-table based or equation-based crosstalk reduction processing. For example, a fractional adjustment factor $\alpha$ can take values between 0-4 for adjustment of a pixel in the left image frame, and a fractional adjustment factor $\beta$ can take values between 0-4 for adjustment of a pixel in the right image frame. Other values and ranges may be used in other examples. For each region in the array, the system can apply different adjustment factors, i.e., weights, denoted as $\alpha_0$, $\alpha_1, \ldots, \alpha_{16}$ for left view and $\beta_0, \beta_1, \ldots, \beta_{16}$ for the right view. As one example, region 62 may have a different adjustment factor than region 94. L is the original pixel value in the left view and L* is the 2D adjusted value generated by the look-up-table based or equation-based crosstalk reduction processing. Similarly, R is the original pixel value in the right view and R* is the 2D LUT adjusted value. In one example, system 100 may therefore generate adjusted pixels according to the following equations:

$$R_{adj0} = R + \beta_0(R^* - R)$$

$$L_{adj0} = L + \alpha_0(L^* - L)$$

This crosstalk reduction system may provide advantages and benefits in terms of better quality 3D display using fewer hardware processing cycles. Applying one uniform crosstalk method on all the pixels displayed on a screen may actually introduce more crosstalk instead of reducing it. By performing two dimensional location based crosstalk adjustment, this system reduces crosstalk everywhere on the screen with a correction calibrated to each region of the screen.

As shown in FIG. 14, in dividing the image frame into the array of regions, system 100 may apply smaller regions along the bottom of the image frame and larger regions along the upper area of the image frame. This is because variation in crosstalk may illustratively become more egregious toward the bottom of the image frame for certain displays, and the crosstalk adjustment may be larger for pixels closer to the bottom of the image frame, and the apportionment of regions shown in FIG. 14 applies greater resolution of crosstalk reduction toward the bottom of the image frame where the pixel adjustment is greater. Accordingly, the topmost row of regions 62, 64, 66, and 68 are the largest, the mid-upper row of regions 72, 74, 76, and 78 are the next largest, the mid-lower row of regions 82, 84, 86, and 88 are relatively small, and the lowest row of regions 92, 94, 96, and 98 are the smallest. It may also be possible to split the frame into regions where the bottom or lower area has larger regions and the top or upper area has smaller for other types of display devices. The splitting may also be done between left and right (e.g., larger on the right and smaller on the left, or vice versa). This may for example be due to synchronization issues between glass and display in stereoscopic displays, a number of timing controllers in the display device, or other display-specific factors in various examples. In other examples, system 100 may also assign region sizes in different sizes in a left part of the image frame compared with the regions or portions in the right part of the image frame. As one example, region 62 may be larger or smaller than region 68, and region 92 may be larger or smaller than region 98.

System 100 may also base the crosstalk correction parameter at least in part on a color of the pixel, and apply differential crosstalk correction parameters to chrominance or luminance, or to different colors in a color coding model, either for pure colors or for a color model that codes for chrominance and luminance in superposition. An image frame may include three or more colors of pixels in a color model, and the crosstalk correction parameter is different based on which color the pixel is in the color model.

For example, the image frame may be coded with R pixels, G pixels, and B pixels in an RGB color model, and the crosstalk correction parameter is different based on whether a pixel is an R pixel, a G pixel, or a B pixel. Since each color channel conveys its own intensity in the RGB color model, crosstalk correction may be applied to all three RGB color channels. In some options, the crosstalk correction parameter may be greater for a G pixel than for an R pixel or a B pixel. The human eye may be more sensitive to crosstalk in G or a human viewer may be more likely to perceive ghosting due to crosstalk in G, so a higher crosstalk reduction in G may be advantageous in some implementations. In other examples, the image frame may be coded with Y' pixels, Cb pixels, and Cr pixels in a Y'CbCr color model or with Y, U, and V pixels in a YUV color model. In these color models, one channel conveys luminance (Y' or Y) and the channels convey chrominance (Cb and Cr or U and V). In these examples the crosstalk correction may be applied differently based on whether a pixel is a Y' pixel, a Cb pixel, or a Cr pixel, or a Y, U, or V pixel. In some options, the crosstalk correction may be greater for a luminance pixel than for a chrominance pixel. A human viewer may be more sensitive to crosstalk in luminance, so applying higher crosstalk correction in the luminance channel, or applying crosstalk correction only in the luminance channel, may be advantageous in some implementations. The crosstalk correction may also be based at least in part on whether the pixel is in a left image frame or a right image frame of a corresponding pair of 3D image frames.

Device 200, or multiview video processing system 100 as shown in FIG. 1, or other implementation, may apply crosstalk reduction techniques when processing right view image frame 210 and left view image frame 220, which may be done after decoding the image frames.

Device 200 or multiview video processing system 100 may also apply additional techniques, such as pre-distortion of the displayed image before final display based on look-up-table based methods, increasing the response time of an LCD display, reducing the contrast ratio of an image or a display, or increasing backlight dimming time, for example. Increasing the backlight dimming time may involve increasing the number of blank lines, such as from 45 to 300, and changing LVDS timing to send 1920×(1080+300) lines instead of 1920×(1080+45) in this example.

While the techniques above are described in terms of being performed by device 200 after a decoding process and/or as part of an image rendering process, these techniques may similarly be performed in either an encoding, transmission, storage, decoding, rendering, or other process, and may be performed by different implementations and/or implementation levels including devices, apparatuses, methods, computer-executable instructions, integrated circuits, sets of integrated circuits (e.g., chip sets), implementations of encoders and decoders including those that include both hardware and software elements, etc.

Figure 15:
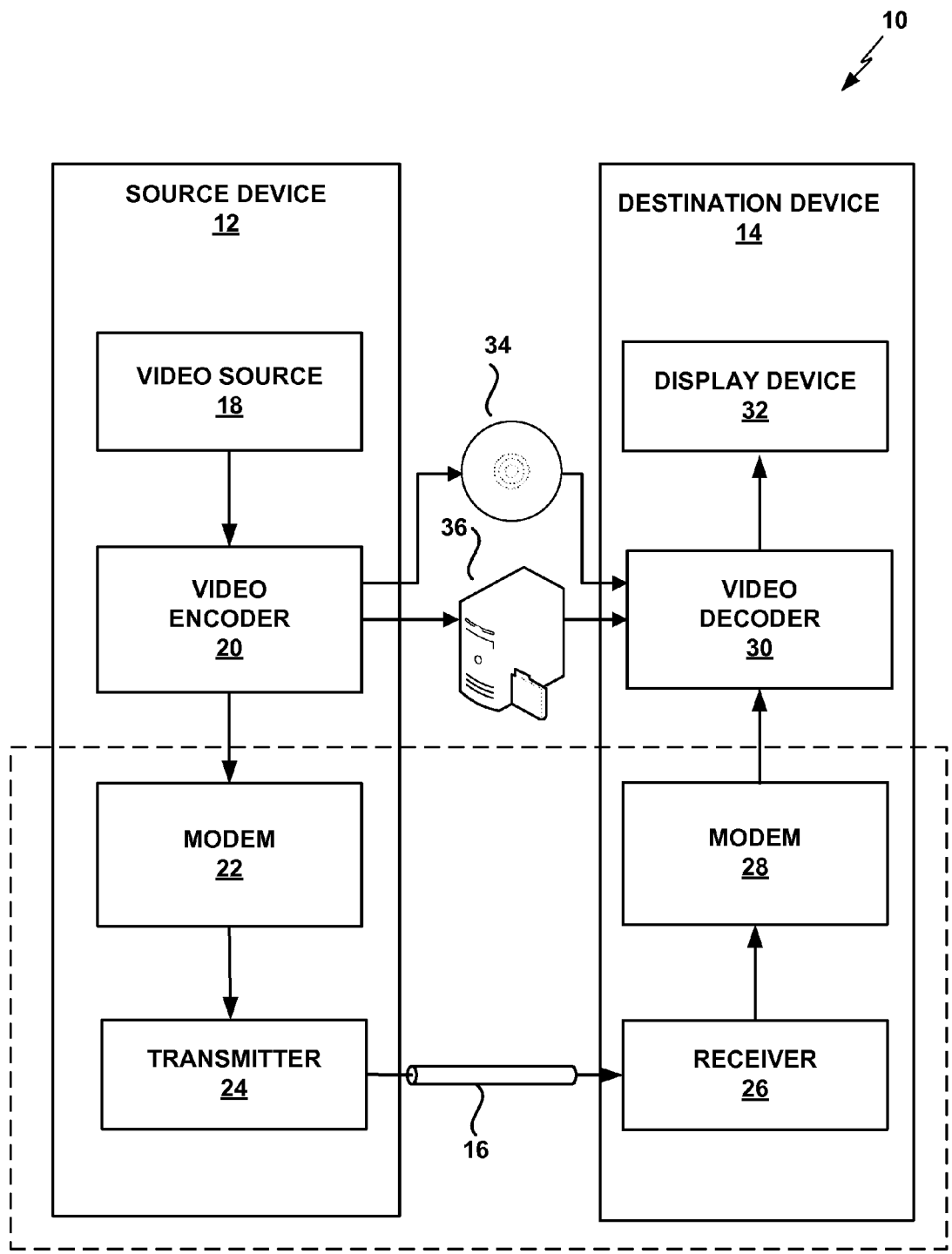
FIG. 15 is a block diagram illustrating an example video encoding and decoding system that may be configured to utilize techniques for multiview video processing in accordance with examples of this disclosure.

FIG. 15 is a block diagram illustrating an example video encoding and decoding system 10 that may be configured to utilize techniques for multiview video processing in accordance with examples of this disclosure. As shown in FIG. 15, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding and processing multiview video data, in accordance with examples of this disclosure, may be applied to video coding in support of any of a variety of multimedia applications, such as over-the-air television broadcasts, cable television transmissions, video gaming, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 15, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. In particular, the video source 18 may be any device configured to produce stereoscopic video data consisting of two or more views (e.g., a left view and a right view). However, the techniques described in this disclosure may be applicable to video coding in general, and may be applied to wireless and/or wired applications, or applications in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 15, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded and processed video data to a user, and may comprise any of a variety of display devices such as a liquid crystal display (LCD), a plasma display, an organic light emitting diode (OLED) display, or another type of display device. The display device 32 may, for example, be a television, a mobile computing device such as a smartphone or tablet computer, or other device, and may include one or more integrated circuits configured with capabilities as described above.

In one example, the display device 14 may be a stereoscopic display capable of displaying two or more views to produce a three-dimensional effect. To produce a three-dimensional effect in video, two views of a scene, e.g., a left eye view and a right eye view may be shown simultaneously or nearly simultaneously. Two pictures of the same scene, corresponding to the left eye view and the right eye view of the scene, may be captured from slightly different horizontal positions, representing the horizontal disparity between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect.

A user may wear active glasses to rapidly and alternatively shutter left and right lenses, such that display device 32 may rapidly switch between the left and the right view in synchronization with the active glasses. Alternatively, display device 32 may display the two views simultaneously, and the user may wear passive glasses (e.g., with polarized lenses) which filter the views to cause the proper views to pass through to the user's eyes. As still another example, display device 32 may comprise an autostereoscopic display, for which no glasses are needed.

In the example of FIG. 15, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the ITU-T H.264 standard, alternatively referred to as MPEG-4, Part 10, Advanced Video Coding (AVC). The video encoder 20 and the video decoder 30 may also operate according to the MVC or SVC extensions of H.264/AVC. Alternatively, the video encoder 20 and the video encoder 30 may operate according to the High Efficiency Video Coding (HEVC) standard presently under development, and may conform to the HEVC Test Model (HM). The techniques of this disclosure, however, are not limited to any particular coding standard. Other examples include MPEG-2 and ITU-T H.263.

Although not shown in FIG. 15, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for multiview video coding in a video encoding process. Likewise, the video decoder 30 may implement any or all of the techniques of this disclosure for multiview video coding in a video decoding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to perform any part of crosstalk reduction pre-processing including crosstalk region mapping and range mapping, as well as crosstalk reduction processing and post-processing, and code a rendering of a pair of image frames based on the crosstalk reduction pre-processing, processing, and/or post-processing, including applying crosstalk correction parameters to the pixels.

In another example of the disclosure, the video decoder 30 of the destination device 14 may be configured to perform any part of crosstalk reduction pre-processing including crosstalk region mapping and range mapping, as well as crosstalk reduction processing and post-processing, and code a rendering of a pair of image frames based on the crosstalk reduction pre-processing, processing, and/or post-processing, including applying crosstalk correction parameters to the pixels.

In one or more examples, the functions described may be implemented in hardware, software, firmware, or any combination thereof. If implemented in software, the software may be written in Java, or in C, C++, C#, Objective-C, Python, Ruby, Clojure, or any other language, for example, or may also be compiled into an assembly language or machine code native to one or more processors of a hardware device, for example. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The terms "non-transitory" and "tangible" may indicate that the storage medium is not embodied in a carrier wave or a propagated signal. However, the term "non-transitory" should not be interpreted to mean that one or more storage devices is non-movable. As one example, with reference to FIG. 15, one or more storage devices may be removed from source device 12, destination device 14, or file server 36, and moved to another device. As another example, a storage device may be inserted into source device 12, destination device 14, or file server 36. A non-transitory storage medium may store data that can, over time, change (e.g., in RAM). Data storage devices may also include any of various forms of volatile memory that may require being periodically electrically refreshed to maintain data in memory, including those that are electrically refreshed at relatively high rates (such as several times per second), while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   identifying a first set of pixels in co-located pairs in a corresponding pair of multiview image frames for which the co-located pairs have a disparity between the pixels that is greater than a selected disparity threshold;
   identifying a second set of pixels in at least one of the image frames that are within a selected distance of an intensity transition greater than a selected intensity transition threshold;
   determining pixels to which crosstalk correction is to be applied based at least in part on the identification of the pixels as being in at least one of the first set of pixels and the second set of pixels; and
   applying crosstalk correction to the determined pixels.

2. The method of claim 1, further comprising applying crosstalk correction only to the determined pixels that are identified as being in both the first set and the second set.

3. The method of claim 1, wherein applying the crosstalk correction to the determined pixels comprises mapping pixel values of at least a portion of the pixels from within a selected bit range to outside the selected bit range.

4. The method of claim 3, wherein the selected bit range is selected from among an 8 bit range, a 10 bit range, and a 12 bit range.

5. The method of claim 1, wherein identifying pixels that have an intensity transition greater than the selected intensity transition threshold comprises applying an edge detection filter to each of a plurality of the pixels in the at least one of the image frames.

6. The method of claim 1, wherein identifying pixels that are within a selected distance of an intensity transition greater than a selected intensity transition threshold comprises identifying pixels that are within a selected distance within a common horizontal row of pixels identified as having an intensity transition greater than the selected intensity transition threshold.

7. The method of claim 1, wherein the selected distance comprises a distance selected from between 1 and 256 pixels.

8. The method of claim 1, wherein the selected distance is 64 pixels.

9. The method of claim 1, further comprising applying adjustment to one or more of the determined pixels to which the crosstalk correction is applied based at least in part on which portion of two or more portions of the image frame the pixel is in.

10. The method of claim 1, wherein identifying pixels that have an intensity transition greater than the selected transition threshold comprises evaluating a transition in luminance values of the pixels.

11. The method of claim 1, wherein identifying pixels that have an intensity transition greater than the selected transition threshold comprises evaluating a transition in one or more chrominance values of the pixels.

12. The method of claim 1, further comprising rendering the corresponding pair of multiview image frames based on the crosstalk correction.

13. The method of claim 1, wherein the crosstalk correction is based at least in part on a color of respective pixel to which the crosstalk correction is applied.

14. The method of claim 13, wherein the image frame includes three or more colors of pixels in a color model, and the crosstalk correction is different based on which color the respective pixel is in the color model.

15. The method of claim 13, wherein the image frame includes R pixels, G pixels, and B pixels in an RGB color model, and the crosstalk correction is different based on whether the respective pixel is an R pixel, a G pixel, or a B pixel.

16. The method of claim 13, wherein the image frame includes R pixels, G pixels, and B pixels in an RGB color model, and the crosstalk correction is greater for a G pixel than for an R pixel or a B pixel.

17. The method of claim 13, wherein the image frame includes Y' pixels, Cb pixels, and Cr pixels in a Y'CbCr color model, and the crosstalk correction is different based on whether a pixel is a Y' pixel, a Cb pixel, or a Cr pixel.

18. The method of claim 13, wherein the image frame includes Y' pixels, Cb pixels, and Cr pixels in a Y'CbCr color model, and the crosstalk correction is greater for a Y' pixel than for a Cb pixel or a Cr pixel.

19. A computer-readable medium storing instructions for a causing a processor to:
   identify a first set of pixels in co-located pairs in a corresponding pair of multiview image frames for which the co-located pairs have a disparity between the pixels that is greater than a selected disparity threshold;
   identify a second set of pixels in at least one of the image frames that are within a selected distance of an intensity transition greater than a selected intensity transition threshold
   determining pixels to which crosstalk correction is to be applied based at least in part on the identification of the pixels as being in at least one of the first set of pixels and the second set of pixels; and
   apply crosstalk correction to the determined pixels.

20. The computer-readable medium of claim 19, further comprising executable instructions for a causing a processor to apply crosstalk correction only to the determined pixels that are identified as being in both the first set and the second set.

21. The computer-readable medium of claim 19, wherein applying the crosstalk correction to the determined pixels comprises mapping pixel values of at least a portion of the pixels from within a selected bit range to outside the selected bit range.

22. The computer-readable medium of claim 21, wherein the selected bit range is selected from among an 8 bit range, a 10 bit range, and a 12 bit range.

23. The computer-readable medium of claim 19, wherein identifying pixels that have an intensity transition greater than the selected intensity transition threshold comprises applying an edge detection filter to each of a plurality of the pixels in the at least one of the image frames.

24. The computer-readable medium of claim 19, wherein identifying pixels that are within a selected distance of an intensity transition greater than a selected intensity transition threshold comprises identifying pixels that are within a selected distance within a common horizontal row of pixels identified as having an intensity transition greater than the selected intensity transition threshold.

25. The computer-readable medium of claim 19, wherein the selected distance comprises a distance selected from between 1 and 256 pixels.

26. The computer-readable medium of claim 19, wherein the selected distance is 64 pixels.

27. The computer-readable medium of claim 19, further comprising executable instructions for a causing a processor to apply adjustment to one or more of the determined pixels to which the crosstalk correction is applied based at least in part on which portion of two or more portions of the image frame the pixel is in.

28. The computer-readable medium of claim 19, wherein identifying pixels that have an intensity transition greater than the selected transition threshold comprises evaluating a transition in luminance values of the pixels.

29. The computer-readable medium of claim 19, wherein identifying pixels that have an intensity transition greater than the selected transition threshold comprises evaluating a transition in one or more chrominance values of the pixels.

30. The computer-readable medium of claim 19, further comprising executable instructions for a causing a processor to render the corresponding pair of multiview image frames based on the crosstalk correction.

31. The computer-readable medium of claim 19, wherein the crosstalk correction is based at least in part on a color of the respective pixel to which the crosstalk correction is applied.

32. The computer-readable medium of claim 31, wherein the image frame includes three or more colors of pixels in a color model, and the crosstalk correction is different based on which color the respective pixel is in the color model.

33. The computer-readable medium of claim 31, wherein the image frame includes R pixels, G pixels, and B pixels in an RGB color model, and the crosstalk correction is different based on whether the respective pixel is an R pixel, a G pixel, or a B pixel.

34. The computer-readable medium of claim 31, wherein the image frame includes R pixels, G pixels, and B pixels in an RGB color model, and the crosstalk correction is greater for a G pixel than for an R pixel or a B pixel.

35. The computer-readable medium of claim 31, wherein the image frame includes Y' pixels, Cb pixels, and Cr pixels in a Y'CbCr color model, and the crosstalk correction is different based on whether a pixel is a Y' pixel, a Cb pixel, or a Cr pixel.

36. The computer-readable medium of claim 31, wherein the image frame includes Y' pixels, Cb pixels, and Cr pixels in a Y'CbCr color model, and the crosstalk correction is greater for a Y' pixel than for a Cb pixel or a Cr pixel.

37. An apparatus comprising:
   means for identifying a first set of pixels in co-located pairs in a corresponding pair of multiview image frames for which the co-located pairs have a disparity between the pixels that is greater than a selected disparity threshold;
   means for identifying a second set of pixels in at least one of the image frames that are within a selected distance of an intensity transition greater than a selected intensity transition threshold
   means for determining pixels to which crosstalk correction is to be applied based at least in part on the identification of the pixels as being in at least one of the first set of pixels and the second set of pixels; and
   means for applying crosstalk correction to the determined pixels.

38. The apparatus of claim 37, further comprising means for applying crosstalk correction only to the determined pixels that are identified as being in both the first set and the second set.

39. The apparatus of claim 37, wherein applying the crosstalk correction to the determined pixels comprises mapping pixel values of at least a portion of the pixels from within a selected bit range to outside the selected bit range.

40. The apparatus of claim 39, wherein the selected bit range is selected from among an 8 bit range, a 10 bit range, and a 12 bit range.

41. The apparatus of claim 37, wherein identifying pixels that have an intensity transition greater than the selected intensity transition threshold comprises applying an edge detection filter to each of a plurality of the pixels in the at least one of the image frames.

42. The apparatus of claim 37, wherein identifying pixels that are within a selected distance of an intensity transition greater than a selected intensity transition threshold comprises identifying pixels that are within a selected distance within a common horizontal row of pixels identified as having an intensity transition greater than the selected intensity transition threshold.

43. The apparatus of claim 37, wherein the selected distance comprises a distance selected from between 1 and 256 pixels.

44. The apparatus of claim 37, wherein the selected distance is 64 pixels.

45. The apparatus of claim 37, further comprising means for applying adjustment to one or more of the determined pixels to which the crosstalk correction is applied based at least in part on which portion of two or more portions of the image frame the pixel is in.

46. The apparatus of claim 37, wherein identifying pixels that have an intensity transition greater than the selected transition threshold comprises evaluating a transition in luminance values of the pixels.

47. The apparatus of claim 37, wherein identifying pixels that have an intensity transition greater than the selected transition threshold comprises evaluating a transition in one or more chrominance values of the pixels.

48. The apparatus of claim 37, further comprising means for rendering the corresponding pair of multiview image frames based on the crosstalk correction.

49. The apparatus of claim 37, wherein the crosstalk correction is based at least in part on a color of the respective pixel to which the crosstalk correction is applied.

50. The apparatus of claim 49, wherein the image frame includes three or more colors of pixels in a color model, and the crosstalk correction is different based on which color the respective pixel is in the color model.

51. The apparatus of claim 49, wherein the image frame includes R pixels, G pixels, and B pixels in an RGB color model, and the crosstalk correction is different based on whether the respective pixel is an R pixel, a G pixel, or a B pixel.

52. The apparatus of claim 49, wherein the image frame includes R pixels, G pixels, and B pixels in an RGB color model, and the crosstalk correction is greater for a G pixel than for an R pixel or a B pixel.

53. The apparatus of claim 49, wherein the image frame includes Y' pixels, Cb pixels, and Cr pixels in a Y'CbCr color model, and the crosstalk correction is different based on whether a pixel is a Y' pixel, a Cb pixel, or a Cr pixel.

54. The apparatus of claim 49, wherein the image frame includes Y' pixels, Cb pixels, and Cr pixels in a Y'CbCr color model, and the crosstalk correction is greater for a Y' pixel than for a Cb pixel or a Cr pixel.

55. The apparatus of claim 37, wherein the apparatus comprises an integrated circuit.

56. The apparatus of claim 37, wherein the apparatus comprises a mobile computing device.

57. The apparatus of claim 37, wherein the apparatus comprises a television.

\* \* \* \* \*